United States Patent [19]
Giordano et al.

[11] Patent Number: 5,544,308
[45] Date of Patent: Aug. 6, 1996

[54] METHOD FOR AUTOMATING THE DEVELOPMENT AND EXECUTION OF DIAGNOSTIC REASONING SOFTWARE IN PRODUCTS AND PROCESSES

[75] Inventors: Gerard J. Giordano; Gregory deMare, both of Sparta; Betsy Longendorfer, Ridgewood, all of N.J.; Michael N. Granieri, Springfield, Va.; John P. Giordano, Sparta; Mary E. Nolan, Lafayette, both of N.J.; Ford Levy, Pleasantville, N.Y.

[73] Assignee: Giordano Automation Corp., Sparta, N.J.

[21] Appl. No.: 284,382

[22] Filed: Aug. 2, 1994

[51] Int. Cl.$^6$ .................... G06C 15/00; G06F 11/00
[52] U.S. Cl. .................. 395/183.02; 395/51; 395/912
[58] Field of Search .................. 395/575, 64, 183.02, 395/911, 912, 50, 51; 371/15.1, 16.1; 364/274.5

[56] References Cited

U.S. PATENT DOCUMENTS

| | | | |
|---|---|---|---|
| 4,866,635 | 9/1989 | Kahn et al. | 364/513 |
| 4,985,857 | 1/1991 | Bajpai et al. | 364/551.01 |
| 4,996,688 | 2/1991 | Byers et al. | 371/16.5 |
| 4,999,833 | 3/1991 | Lee | 370/94.1 |
| 5,107,497 | 4/1992 | Lirov et al. | 371/15.1 |
| 5,107,499 | 4/1992 | Lirov et al. | 371/15.1 |
| 5,109,380 | 4/1992 | Ogino | 371/15.1 |
| 5,127,005 | 6/1992 | Oda et al. | 371/15.1 |
| 5,195,095 | 3/1993 | Shah | 371/15.1 |
| 5,214,653 | 5/1993 | Elliott, Jr. et al. | 371/15.1 |
| 5,375,070 | 12/1994 | Hershey et al. | 364/550 |
| 5,377,196 | 12/1994 | Godlew et al. | 371/20.1 |
| 5,394,543 | 2/1995 | Hill et al. | 395/575 |
| 5,404,503 | 4/1995 | Hill et al. | 395/575 |
| 5,412,802 | 5/1995 | Fujinami et al. | 395/575 |

OTHER PUBLICATIONS

Giordano & Levy, Re-Engineering the Test Development Process, AUTOCON '94 (IEEE), at 527.

Perera, Systems Reliability and Availability Prediction and Comparison with Field Data for a Mid-Range Computer, 1993 IEEE Reliability and Maintainability Symposium Proceedings, at 33.

Perkusich et al., "A Petri Net Approach for Knowledge Base Construction for Fault Analysis and Control of Descrete Time Systems", ICON '91 (IEEE), at 1631.

Unbehend, Knowledge Based Monitoring and Diagnosis in Machine Maintenance, Intelligent Systems Engineering, 1994 Conference, at 448.

(List continued on next page.)

*Primary Examiner*—Robert W. Beausoliel, Jr.
*Assistant Examiner*—Alan M. Fisch
*Attorney, Agent, or Firm*—Ostrager, Chong & Flaherty

[57] ABSTRACT

A method for automated diagnosis of faults in a system containing repairable parts is performed by selecting a set of faults representing all known failures which can occur among the parts of the system, characterized by symptom data representing the expected passing or failing results for tests applied at selected test locations in the system, generating a fault/symptom matrix of the set of faults mapped to the expected passing and failing results for the selected test locations, then performing actual tests one or more test locations and correlating the actual passing or failing test results to the fault/symptom matrix in order to identify a suspect list of faults. Additional tests may be performed until the suspect list cannot be reduced further. For efficiency, the tests are selected according to which have most diagnostic significance. The design data for the parts of the system are captured and the fault/symptom matrix is preprocessed for diagnostic efficiency and speed during run time. The diagnostic method can be implemented on a single microchip and embedded in a system for on-line diagnosis during system operation, for equipment testing, or even operator training.

18 Claims, 17 Drawing Sheets

OTHER PUBLICATIONS

Castanon, Optimal Search Strategies in Dynamic Hypothesis Testing, IEEE Transactions on Systems, Man, and Cybernetics, Jul. 1995, at 1130.

Simpson, 1982 IEEE Proc. CH1786–3/82, "The ARCINC Research System Testability and Maintenance Program", at 88.

Simpson, 1985 IEEE Proc. CH2177–4/85, "Stamp Testability and Fault–Isolation Applications", at 208.

De Paul, 1985 IEEE Proc. CH2177–4/85, "Logic Modelling as a Tool for Testability", at 203.

Simpson, 1987 IEEE Autotestcon "Active Testability Analysis and Interactive Fault Isolation Using Stamp", at 105.

|      | T0 | T1 | T2 | T3 | T4 | T5 | T6 | T7 | T8 | T9 |
|------|----|----|----|----|----|----|----|----|----|----|
| U1   | P  | F  | P  | P  | F  | P  | P  | F  | P  | P  |
| U2   | F  | P  | P  | F  | P  | P  | P  | F  | P  | F  |
| U3   | F  | F  | P  | P  | P  | F  | P  | P  | P  | F  |
| U4   | P  | F  | P  | P  | F  | F  | P  | P  | F  | F  |
| U5   | F  | F  | F  | P  | P  | F  | P  | P  | P  | P  |
| U6   | F  | P  | P  | P  | P  | F  | P  | P  | P  | P  |
| U7   | F  | P  | P  | P  | P  | P  | P  | F  | P  | P  |
| U8   | P  | P  | P  | P  | P  | P  | F  | P  | F  | F  |
| U9   | P  | P  | F  | P  | F  | F  | F  | P  | P  | F  |
| U10  | P  | P  | F  | P  | P  | P  | F  | P  | F  | P  |

FAULTS = Components U1 through U10

SYMPTOMS = Tests T0 through T9

P = Test Passes

F = Test Fails

METHOD FOR AUTOMATING THE DEVELOPMENT AND EXECUTION OF DIAGNOSTIC REASONING SOFTWARE IN PRODUCTS AND PROCESSES

BACKGROUND OF INVENTION

Conventional methods for automatically diagnosing faults in products and processes utilize reasoning techniques that are difficult to develop and do not localize a fault to the extent possible or are ineffective at handling multiple faults or faults that were not previously modeled. Such automated diagnostic reasoning techniques have been incorporated in technical maintenance manuals and automatic test equipment.

Technical Maintenance Manual Background

Many technical maintenance manuals use hand coded fault trees to support the troubleshooting procedures along with technical information. Some commercially available technical maintenance manuals, however, have used dependency model reasoning and expert system rules to support troubleshooting. In each of these cases, the weakness of the diagnostic reasoning has made it secondary to the optimal sequencing of tests used to find the faulty item by elimination.

Sophisticated computer programs for generating optimum fault trees to guide the technician in troubleshooting have been developed and are commercially available from companies such as Arinc and Detex. The Arinc approach uses a dependency model of the product and generates an optimum test sequence referred to as POINTER. Pointer is a commercially available product which directs the technician through a sequence of measurements required to identify a faulty component. The Arinc system has been described in the literature by W. R. Simpson and various associates. Several key articles are referenced below:

Simpson, W. R. and H. S. Balabow. "The Arinc Research System Testability and Maintenance Program. (STAMP)". IEEE AUTOTESTCON (1982): 88–95

Simpson, W. R. "Active Testability Analysis and Interactive Fault Isolation using STAMP". IEEE AUTOTESTCON (1987):105.

Simpson, W. R. "STAMP Testability and Fault Isolation Application 1981–1984". IEEE AUTOTESTCON Proceedings (1985):208–215.

The Detex System also uses a dependency model to generate an optimum test sequence. The commercial product is called GADS (Generic Adaptive Diagnostic System). It also uses proprietary algorithms to sequence the tests. In an article by R. A. DePaul, Jr. cited below:

DePaul, R. A., Jr. "Logic Modeling as a Tool for Testability" IEEE AUTOTESTCON Proceedings (1985):203–207.

Both Pointer and GADS require model editors to enter data into their testability modeling programs. This has proved to be time consuming for engineers. Additionally, both methods result in the generation of fault trees that are implemented by the entry of measurement data in a specific sequence either by the technician performing the measurements or by the test program performing the same measurements. Both the modeling techniques and required measurement sequences have increased test programs cost significantly.

Concurrent with the ARINC and Detex efforts, the U.S. Government initiated a program on Integrated Diagnostics Support System (IDSS). The government program included engineers from Detex, Harris, Inc., and Giordano Associates, Inc. As a result of the IDSS program, the government developed a Weapon System Testability Analyzer (WSTA) and an Adaptive Diagnostic Subsystem (ADS) which behaved similarly to the ARINC and Detex commercial systems.

Attempts to apply the techniques inherent in the Detex, ARINC, and Navy approaches were not entirely successful. The present invention was developed to overcome the shortcomings of the prior approaches.

Automatic Test Equipment Background

Several attempts have been made to introduce the automated technical maintenance manual techniques to accomplish automated diagnostics in automatic test equipment. While the results have often been deemed successful, the test program set development community has not embraced the approach, in part, because test sequences are often driven by other test related factors making the automatic technical maintenance sequences academic.

Automated diagnostic reasoning in automatic test equipment has generally been restricted to digital tests that have been evaluated by a digital fault simulator. The primary reasoning technique has been fault signature lookup. When several faults match a simulator generated signature, probing is used to identify which part has good inputs and bad outputs. When the symptom data does not match any of the simulator generated signatures, ineffective ad hoc algorithms have been used. The complexity of modern electronics forces more and more dependence on these ad hoc methods with the consequence that some organizations no longer use fault signature lookup techniques.

Fault signature lookup methods have been commercially developed by GenRad and Teradyne among other automatic test equipment manufactures. The implementations have generally been for a specific fault simulator and a specific set of automatic test equipment.

Diagnostic Reasoning Technology Background

Commercial systems have used two diagnostic reasoning techniques based on system models: dependency analysis and fault signature lookup. Research efforts have implemented a model based minimum set covering reasoning technique and several learned data techniques using bayesian probabilities, function fitting and neural networks.

Dependency analysis is the weakest form of diagnostic reasoning. It implements fault localization by excluding all faults for which the diagnostic data contradicts the dependency model expectations by showing no failure. The resulting fault localization sets are large. As a consequence, dependency analysis is seldom used as a reasoning technique by itself. Instead, it is used as part of a diagnostic test sequence which eventually tests many of the inputs and outputs of the faulty part.

For the failures that have been modeled, the fault signature lookup technique has the virtue missing in the dependency analysis. It provides excellent fault localization. With much less data, the fault signature lookup technique can identify the faulty part or a small set of alternative faulty parts where dependency analysis would suspect a prohibitive number of possible faulty parts. The weakness of the fault signature lookup technique is in its inability to handle either multiple faults or faults that have not been modeled. In systems where fault signature lookup has been implemented, ad hoc algorithms have been added to address such situations. These techniques have generally not proved successful.

The minimum fault covering reasoning technique has the same fault localization capabilities as fault signature lookup plus the ability to handle multiple faults and faults that have not been modeled. Its outputs are minimum covering combinations of faults that would cause the model to display the same diagnostic results as are observed. The identification of these combinations is made efficient through the use of generator sets made up of faults that can be substituted indistinguishably in listing a fault set that shows the observed symptoms. The weakness of this technique lies in the amount of time, even for a supercomputer, that it takes to generate this list.

Other diagnostic approaches which exist today include "rule based" expert systems generated with artificial intelligence computer software languages such as LISP. Expert systems thus generated suffer from the problem of expensive generation and the requirement for having system experts available to generate rules. They also are difficult to change in the field when problems arise that had not been anticipated. Extensive literature exists on rule based expert systems across many different industrial areas.

Neural networks have received a great deal of attention from industry in order to solve the diagnostic problem that exists. Neural networks will learn the behavior of a system and duplicate that behavior in the field. Neural networks are trained by introducing many failures and providing the neural network with test results. This training process has caused some problems on implementation of neural networks.

The above conventional methods and the existing technologies all require expensive, labor intensive approaches for generating the knowledge base to be used for diagnostics. They also produce fault trees which must be sequenced by expensive automatic test programs or technician based manual test procedures.

Giordano Automation has developed and productized a "Diagnostician" which uses a model based reasoning technique which is stronger than the dependency analysis and fault signature lookup techniques and is less computer intensive than the minimum set covering technique.

SUMMARY OF INVENTION

The subject invention is an innovative diagnostic reasoning process that is more powerful than conventional techniques in identifying the replaceable part that caused a failure (fault isolation) or more able to handle unexpected cases caused by multiple faults and faults that have not been modeled. The subject invention, when embedded in or applied to a product or process, is able to identify faulty parts in a system based on data about critical product/process parameters that are provided by monitoring and embedded test devices. It can be applied once to all the data available or applied iteratively to evaluate incremental additions of data until it has localized the fault or faults to the replaceable part or parts.

The subject invention provides a process methodology for diagnostic reasoning that can be operated independently of the test measurement and evaluation process methodology. The subject invention utilizes a diagnostic knowledge base to obtain the information needed for the diagnostic reasoning. This diagnostic knowledge base also contains the information needed to interface with the test measurement and evaluation methodology utilized. The subject invention, itself, is embedded in a run-time software module that need not be customized for diagnosis of a specific system.

The diagnostic knowledge base used by the subject invention contains names that are used for communicating with technicians and test programs, a fault/symptom matrix and a fault covering table. The fault/symptom matrix and fault covering table embodies knowledge about failures that can occur in a design and the names identify each component that can fail, each test that can be run or monitored and each symptom that can be gathered from those tests. Because the fault/symptom matrix and fault covering tables contain a mapping of faults to symptoms, they form the basis for diagnostic reasoning by the invention's run-time inference engine.

The subject invention is a new and useful diagnostic reasoning process which enhances and optimizes fault isolation procedures resulting in more efficient and accurate product/process diagnoses. It employs a diagnostic reasoning paradigm predicated on plausible inference based on both the hardware design and the test results obtained.

The subject invention can operate on any set of data that can be obtained. Consequently, it is test sequence and grouping independent. At each point where the diagnostic reasoning process is invoked, the subject invention identifies the most plausible faulty parts. Each increment of pass/fail information provided adds to the accuracy or localization of the faulty part(s) identified by the subject invention as output.

The subject invention is capable of identifying faults at the design locations modeled, faults that are internal to replaceable parts that are not modeled and multiple faults. The latter two capabilities are needed for practical diagnosis of large complex products or processes. When these features are combined with effective fault localization, they provide a considerable advancement in the art of diagnostic reasoning.

Prior art diagnostic reasoning methods, defined in the background section above, include expert (rule-based) systems, neural nets, dependency models, fault signature lookup, and implementation of diagnostic fault trees. Each of these methods fails to fully address the diagnostic problem. In system level applications, each requires excessive time to develop. During run-time, these prior art methods either fail to localize the faulty component to the extent possible or are unable to effectively generate diagnostic inferences for multiple fault failure conditions or providing a most plausible inference in the absence of performance monitoring or test-related data elements.

The subject invention is a diagnostic reasoning method and apparatus which is designed to support a dynamic capability to diagnose faults in a product or process. It identifies the location of a fault to the smallest group that can be identified with the test results or observable data available. It does not require data to be input one test at a time or in any particular order. It provides a diagnostic reasoning capability that does not restrict the method of developing test data or the test data gathering system used.

The diagnostic reasoning method utilizes a structured knowledge base containing information predicated upon first principles of design (connectivity and behavior). The diagnostic run-time inference engine is an innovative fault isolation algorithm which uses cones of evidence to discern the cause or causes of a product/process failure. The method utilizes minimum set covering technology and eliminates the excessive computation time of minimum set covering by computing only identified faults that would be in the minimum covering sets.

Together, the diagnostic knowledge base and AI algorithms (run-time inference engine) are embodied in a product known as the Diagnostician. The Diagnostician™ is a complete run-time system which uses the structured knowledge base, pass/fail test results, and artificial intelligence algorithms to produce diagnoses. The user can pre-program the Diagnostician™ to output fault call-out data, repair instructions, or other types of instructions—whatever is appropriate to the situation.

The Diagnostician™ is a system independent run-time module. For different applications, the designer must only be concerned with how to get information into the Diagnostician™ and how to get information from the Diagnostician™ to the user. The input is linked to test results and the output may be electronic technical information provided to the user as required by the run-time decisions.

The structure of the Diagnostician™ leads to a host of applications which bring true meaning to the word "SMART". Interactive electronic technical manuals, portable maintenance aids, automatic test equipment, bus data interpreters, and embedded diagnostic systems can all be made SMART with the use of the run-time system.

For embedded applications, the Diagnostician™ run-time system is embodied on a microcontroller to interpret the results of scan (e.g., boundary scan, level sensitive scan) tests and faulty item call-out. The "chip set" containing the processor, memory, and input registers for pass/fail test information is a Motorola 68F333. The structured knowledge base (fault/symptom matrix) and the AI inference engine reside on the chip set with interfaces to test inputs and display outputs. In this application, the microcontroller chip set becomes a self contained embodiment of the run-time system capable of providing automated fault isolation at all hierarchies of system design in real time. This provides on line process and system decision making.

STATEMENT OF THE OBJECTS OF THE INVENTION

It is the principle object of the subject invention to provide a method and apparatus for performing automated diagnostic reasoning in products or processes. A complete run-time system embodied on a microcontroller chip set provides self contained automated diagnostic analysis and decision making for systems and sub-systems.

Other objects, advantages and novel features of the invention will become apparent from the following detailed description of the invention when considered in conjunction with the accompanying drawings.

BRIEF DESCRIPTION OF THE DRAWINGS

FIG. 7 is a Fault/Symptom Matrix example.

DESCRIPTION OF THE PREFERRED EMBODIMENTS

The preferred embodiment of the diagnostic knowledge base (fault/symptom matrix) and the artificial intelligence reasoning algorithms is on a completely self sufficient executive run-time system operating on a micro controller with embedded processing, memory, and I/O capability. This embodiment is shown on FIG. 1. The microcontroller chip set containing the knowledge base and AI inference engines can be integrated into any complex product at either the system or subsystem level.

Figure 1:
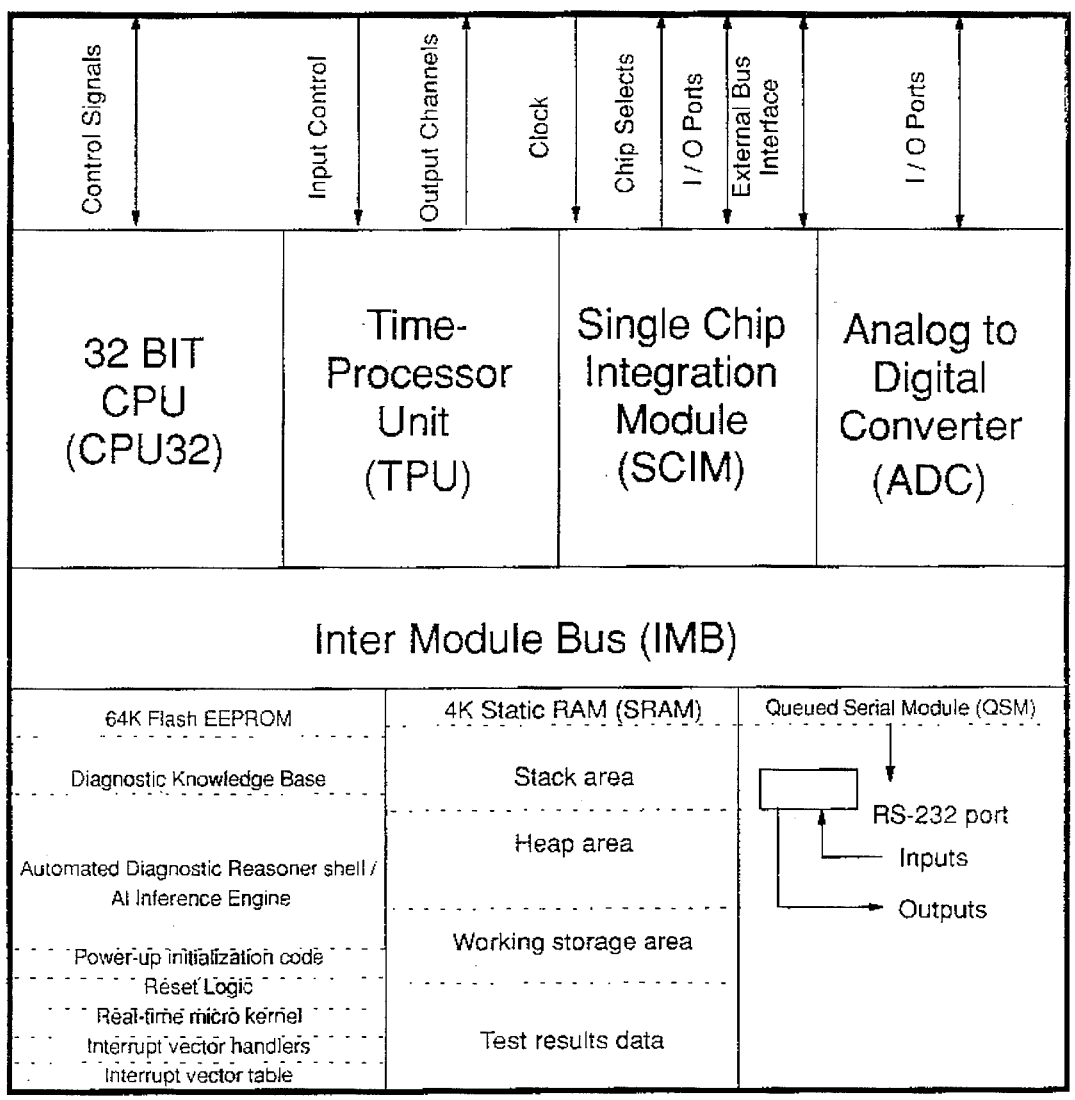
FIG. 1 is a view of the interaction of the structured knowledge base (fault symptom matrix) and the inference engine (AI algorithms) operating as a complete diagnostic run-time system embodied on a Motorola 68F333 microprocessor.

As illustrated in FIG. 1, the Motorola 68F333 microcontroller contains a 32 bit central processing unit, a time processing unit, a single chip integration module and an analog to digital converter. These components of the microcontroller are connected to the outside world via control signals, input control, output channels, external clocks, chip selects, input/output ports, external bus, interfaces and input/output ports to the analog to digital converter. Internal communications among the microcontroller modules are affected through the intermodule bus. The 68F333 also contains a queued serial module with an RS232 port. The diagnostic knowledge base is hosted on a 64K flash EEPROM. Also hosted on the 64K flash EEPROM is the diagnostic inference engine. Additional software required for operation is also housed on the 64K flash EEPROM and includes power up, initialization code, a run-time micro kernel, interrupt vector handlers, and an interrupt vector cable. In operation the queued serial module inputs data from the test collection system and stores the results in the test results data area in the 4K static RAM. After analysis by the inference engine utilizing the stored diagnostic knowledge base, the results are passed out through the queued serial module output port. The detailed operation of the exact steps executed in this process are provided under the operation section in this document, Part 5.

Figure 2:
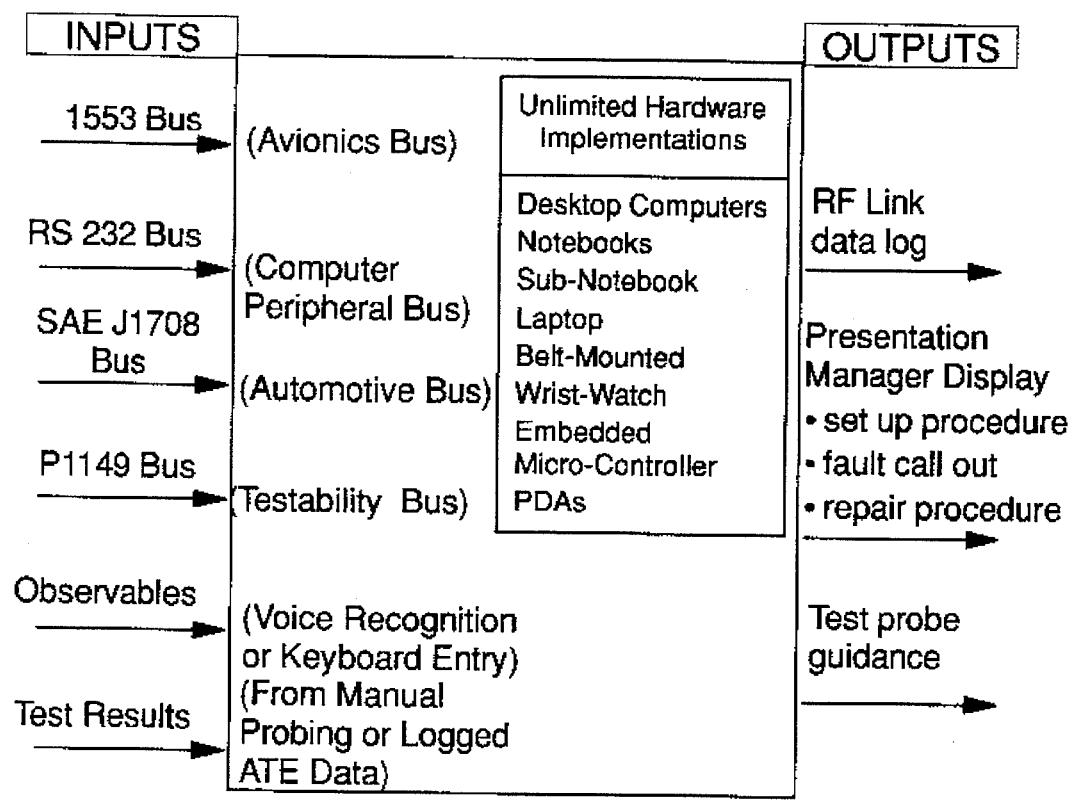
FIG. 2 is a view of the embodiment of the invention in a smart portable maintenance aid (e.g., hand-held computer, possibly with instrumentation).

Embodiment of the subject invention on a microcontroller allows the automated diagnostics to be performed in an embedded mode for both processes and products. FIG. 2 shows that various desktop and notebook configurations can be utilized for the intelligent maintenance aid performing automated diagnostics. The diagnostic knowledge base and the AI inference engine are both embedded in the PC. They require 16 MHz of memory and they will operate in either DOS or UNIX environments with PCs, Pentiums or Power PCs. FIG. 2 shows the inputs and outputs to the desktop notebook in order to perform automated diagnostics.

Data inputs to the intelligence maintenance aid performing automated diagnostics are shown on the left side of FIG. 2. They include three classes of test collection type systems. The first is interaction with the unit under test through a bus. Four standard buses are shown. Non-standard buses can also be utilized. The buses shown are the 1553 bus which is used for avionics interfaces to prime item electronic boxes, an RS232 bus used for computer peripheral equipment, and SAE bus used for automotive testing, a P1149 bus which has been standardized by the Institute of Electrical and Electronic Engineers for interfacing to a circuit or printed circuit board with testability structures.

The second type of input data to an intelligent maintenance aid is called observables. Observables can be entered by voice recognition systems. Using voice recognition systems, the operator of the intelligent maintenance aid may read panel lights and panel meters and enter pass/fail results through a microphone to the computer knowledge base. Observables are may also exist as reports from prior users which can be entered via a keyboard into the computer.

The final type of input intelligence maintenance aid is test data. Test data can be gathered by manual means using portable instrumentation. The AI inference engine resident in the PC will guide the technician on manual probing. The inference engine will develop a new probing decision for each test made thereby creating a dynamic fault tree for the technician. The intelligence maintenance aid may also accept logged test results from existing automatic test systems that do not have diagnostics. The system will accept as input the test results and provide, through the inference engine, fault call-outs.

There are three basic types of outputs shown on the right side of FIG. 2. The first is an RF link and data log capability which is used when the operator is just collecting data and sending it to a station that is remote from the forward area. This data can usually be used at a depot to prepare for maintenance actions based upon field failures.

The second type of output which is the most common is an output to a presentation manager display system which provides on-line information to the operator using the PC display directly. The display system can be used to advise the technician on a setup procedure for making particular tests. It is usually used to call out the particular faults found. Upon the fault being found, the display system can also call out a detailed repair procedure using authored text and graphics that have been entered into its memory.

The third general type output for the intelligent maintenance aid is what is known as test probe guidance. Test probe guidance will advise the technician on the optimum next test to perform in order to reduce ambiguity groups. The guidance provided the technician is of a dynamic nature and will change for each measurement accomplished. Prior systems utilize static fault trees.

Figure 3:
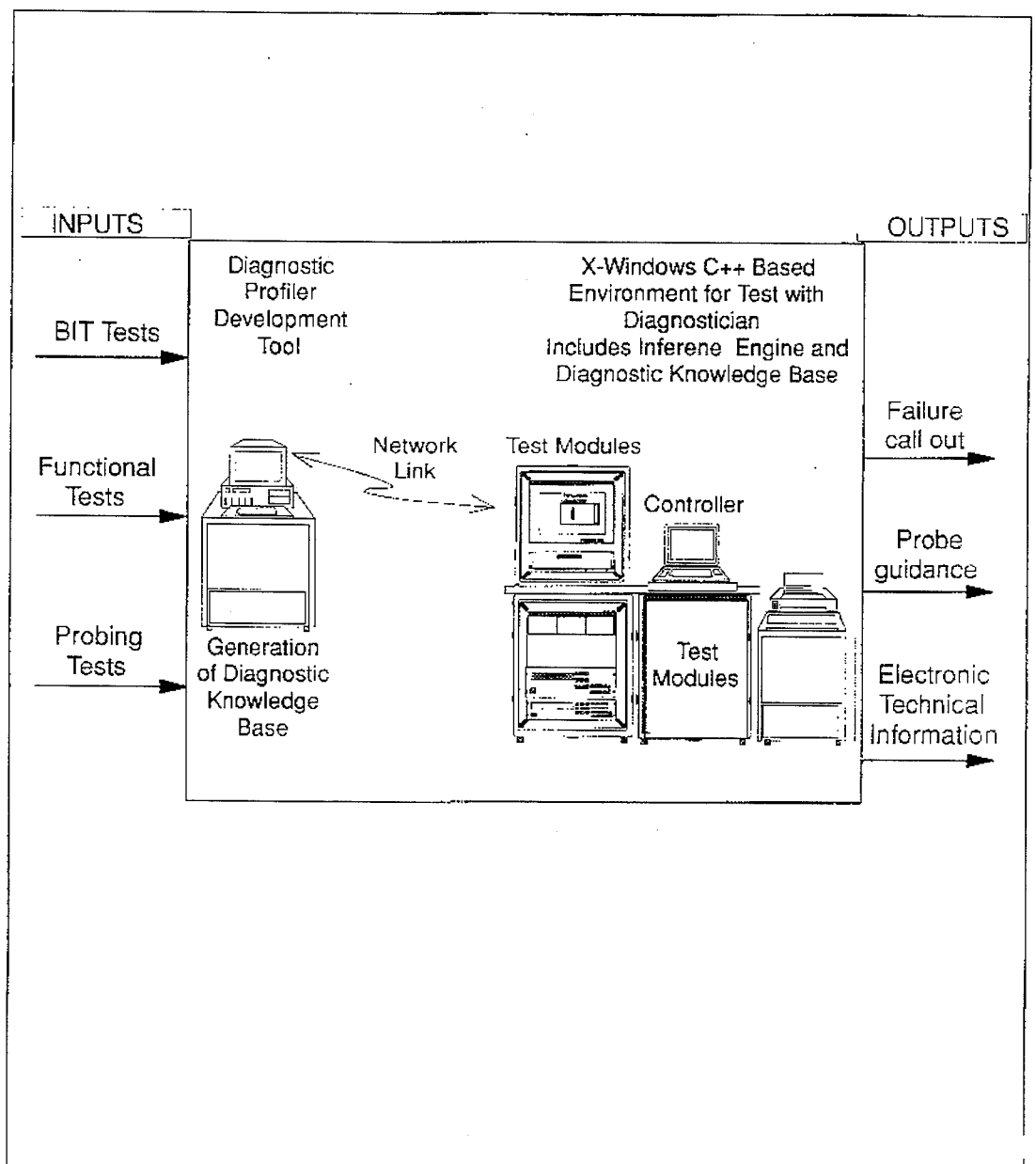
FIG. 3 is a diagnostic view of the embodiment of the invention in an automatic test equipment (e.g., large scale test system which is computer controlled and contains a suite of instrumentation for performing stimulus and measurement tests).

FIG. 3 is an embodiment of the run-time system for diagnostics on an automatic test equipment platform used for both production and maintenance tests. In this embodiment, the input data is collected by instrumentation in the automatic test equipment directed by test procedures under computer control as written by the test programmer. The diagnostic run-time system will utilize the diagnostic knowledge base of the unit under test and perform automated diagnostics by interpreting the pass/fail automatic test results using the AI inference engine. Since the diagnostics is provided by the run-time system automatically, complex diagnostic flow charts and troubleshooting programs would be eliminated from factory and depot environments. The test system depicted in FIG. 3 includes a software development workstation which includes the Diagnostic Profiler™ tool set to generate a diagnostic knowledge base. This diagnostic knowledge base is linked to the tester by a network or transported with a floppy disk to the controller within the test station. The controller for the test station shown in FIG. 3 utilizes an X-Windows C++ off-the-shelf test software system which hosts the Diagnostician. The Diagnostician™ contains the diagnostic knowledge base and the inference engine required for automated diagnostics. Also shown on FIG. 3 are the standard test modules for analog, RF and digital test.

Operation

Figure 4:
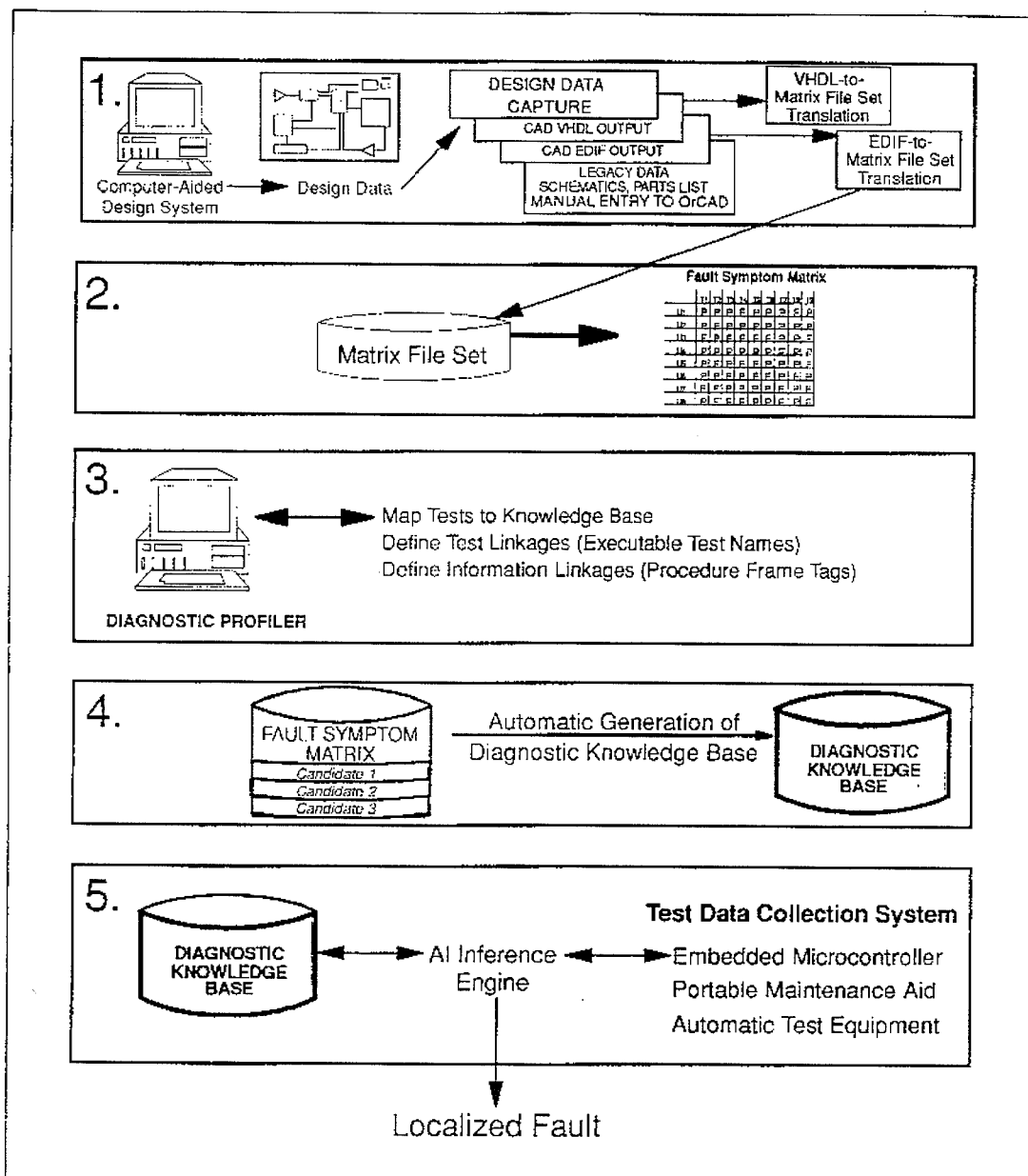
FIG. 4 is a Data Flow Transformation Diagram showing the generation of the fault/symptom matrix directly from design data, transformed into a run-time knowledge base which then is used directly by the AI Inference run-time system.

FIG. 4 is a generic data flow transformation diagram of the overall system independent of the particular embodiment. FIG. 4 will be used to illustrate the overall operation of the invention. FIG. 4 includes development of the diagnostic knowledge base and the run-time operations.

The automated diagnostic run-time system embodying the subject invention implements the diagnostic reasoning activities beginning with the development of the diagnostic knowledge base and ending with identification of faulty replaceable parts for a failed system. This can be divided into five distinct pads as follows: Pad One (1) Capture of the design data, Part Two (2) Translation of the design data into a Diagnostic Knowledge Base, Pad Three (3) Addition of Test and User Display information to the Diagnostic Knowledge Base, Part Four (4) Preparation of the Diagnostic Knowledge Base for efficient run-time operation, and Pad Five (5), Applying the diagnostic algorithms that use the run-time Diagnostic Knowledge Base to acquire test data, interpret it dynamically, and localize failures to the physical cause or causes. FIG. 4 provides an overview of this process, and the following subsections detail the operations.

Part One (1)—Design Data Capture

The Diagnostician™ utilizes a model of the design being tested to dynamically localize a fault based on received test results or symptoms. In order for the model to be accurate and usable, it must contain all the components in the design (replaceable units) and all of the interdependencies of the components with each other and any external connectors.

Figure 5:
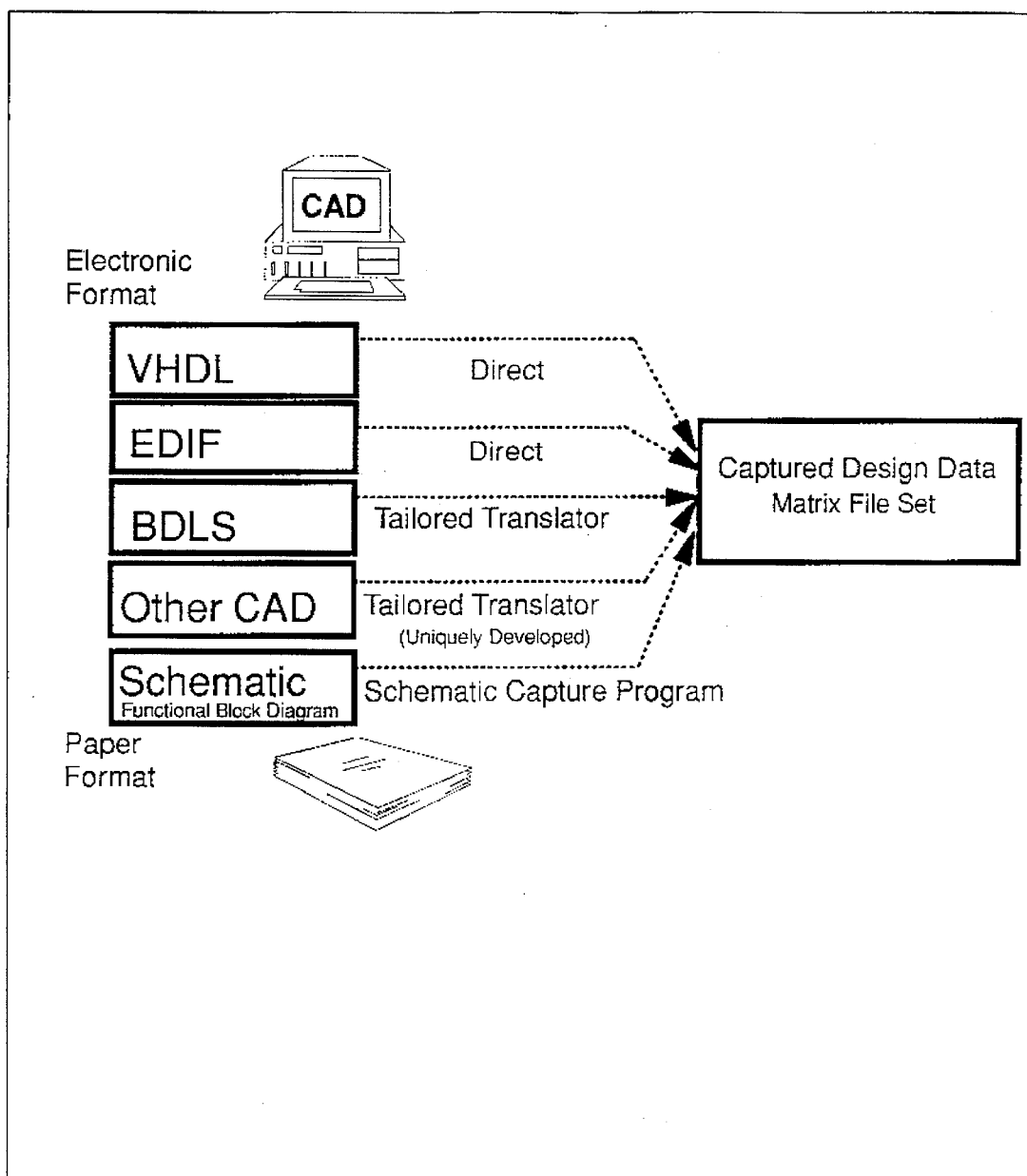
FIG. 5 is a Design Data Capture Flow Chart.
Figure 6A:
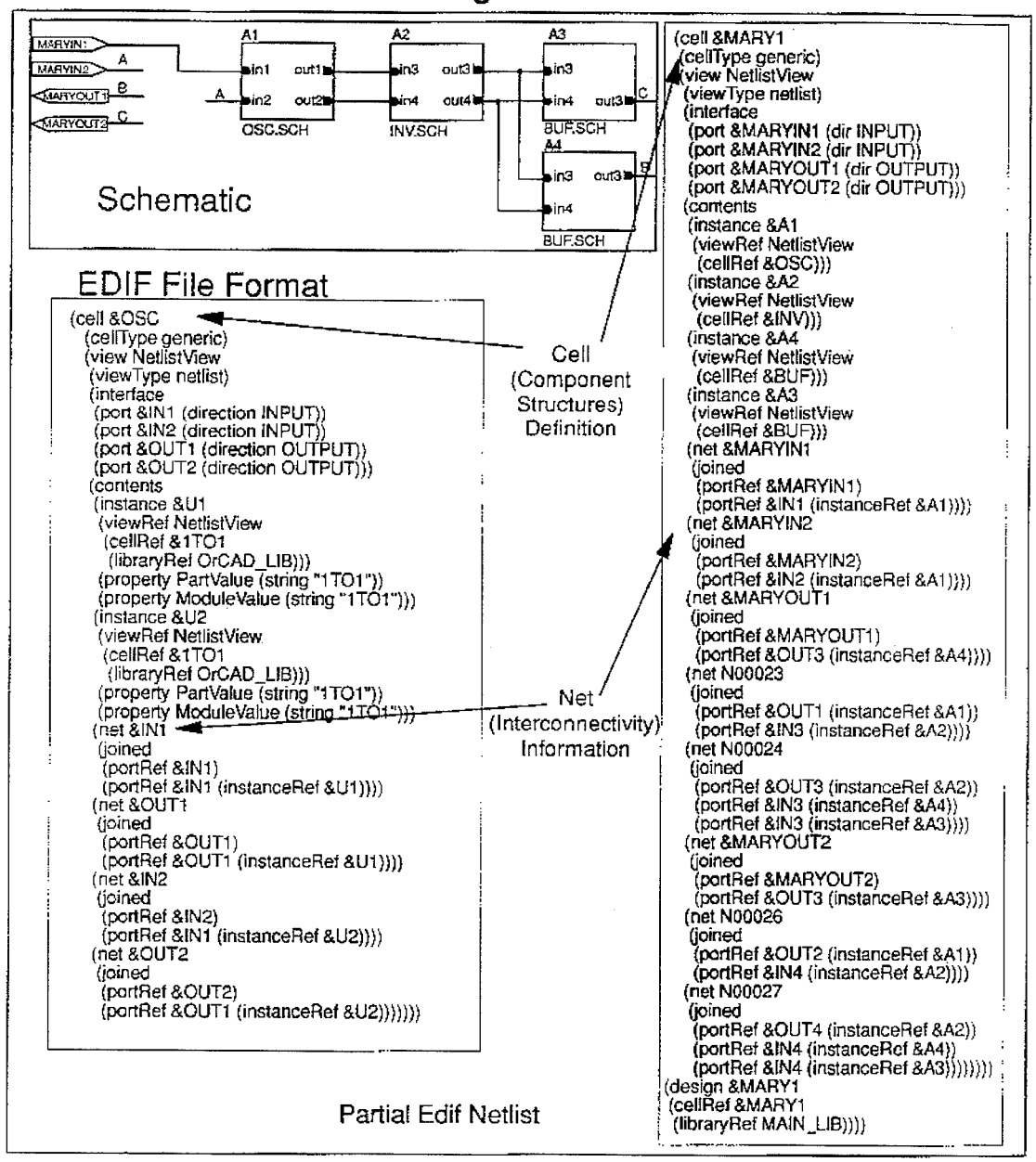
FIG. 6 is an example of design data capture and transformation from a schematic to an EDIF file to a fault/symptom matrix, which includes a hierarchical representation of the design, resulting in a parent and child models.
Figure 6B:
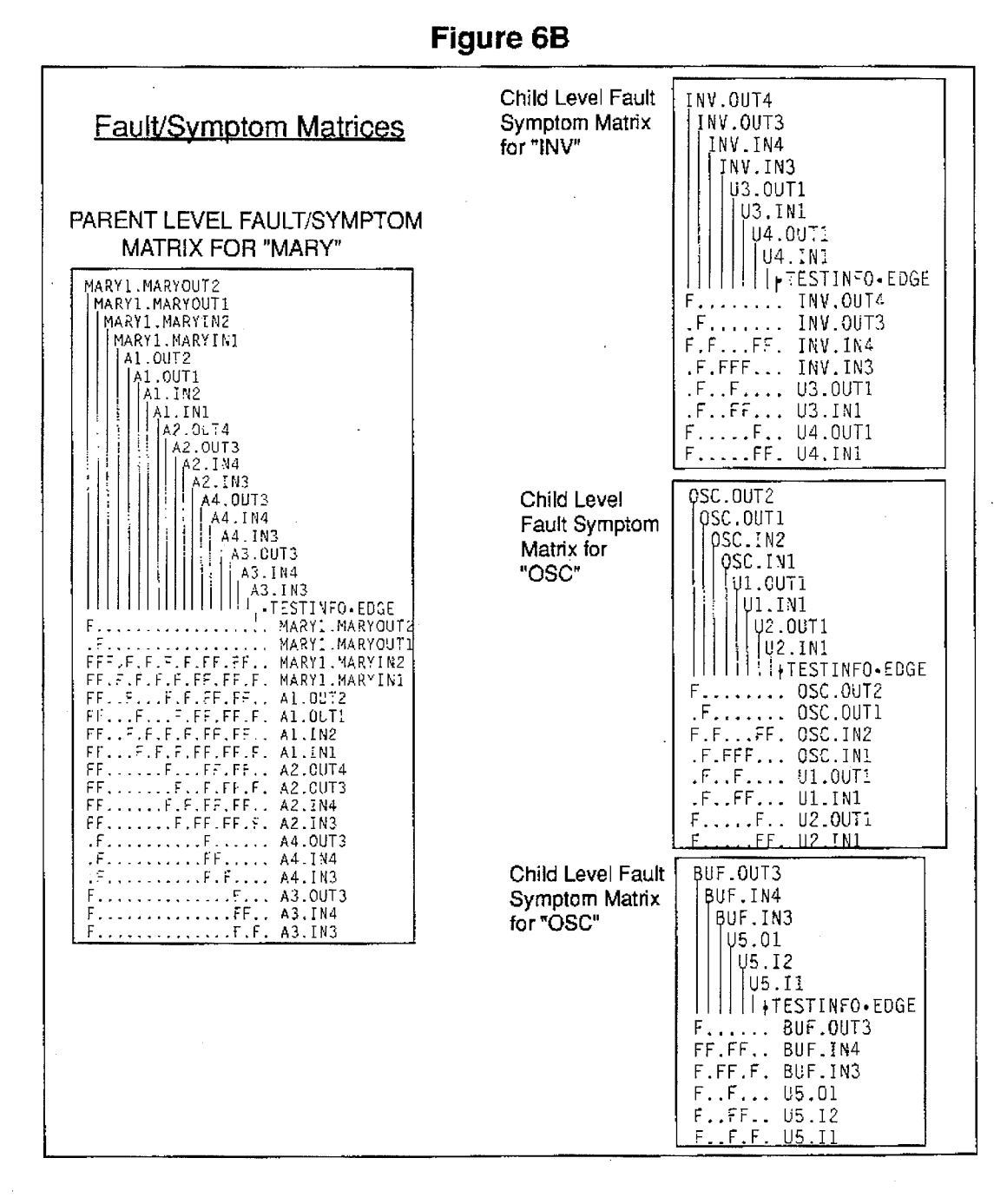

So as to allow the Diagnostician™ to be used for a wide range of designs and design methodologies, several types of design input formats can be captured. FIG. 5 lists these formats. If the design data is in electronic format, either Vhsic Hardware Description Language (VHDL) or Electronic Design Interchange Format (EDIF) can be used. Input of design data in electronic format is the most efficient and risk-free method. When electronic data on the design is not available (typical for older designs) another method is available. Utilizing popular schematic design tools (SDT), either schematics of the design, or functional block diagrams, if detailed, can be manually redrawn in the SDT. Once the design has been captured, the process of transforming the data into a Diagnostic Knowledge Base or Fault/Symptom Matrix is independent of whether the data was originally in electronic or paper format. FIG. 6 is an example of design data capture, showing the transformation of a schematic into an EDIF file format and finally into a fault/symptom matrix. In this example, a hierarchical model is used, and therefore, the result is a series of fault/symptom matrices.

Part Two (2)—Translation of the Data Into a Diagnostic Knowledge Base

Figure 8:
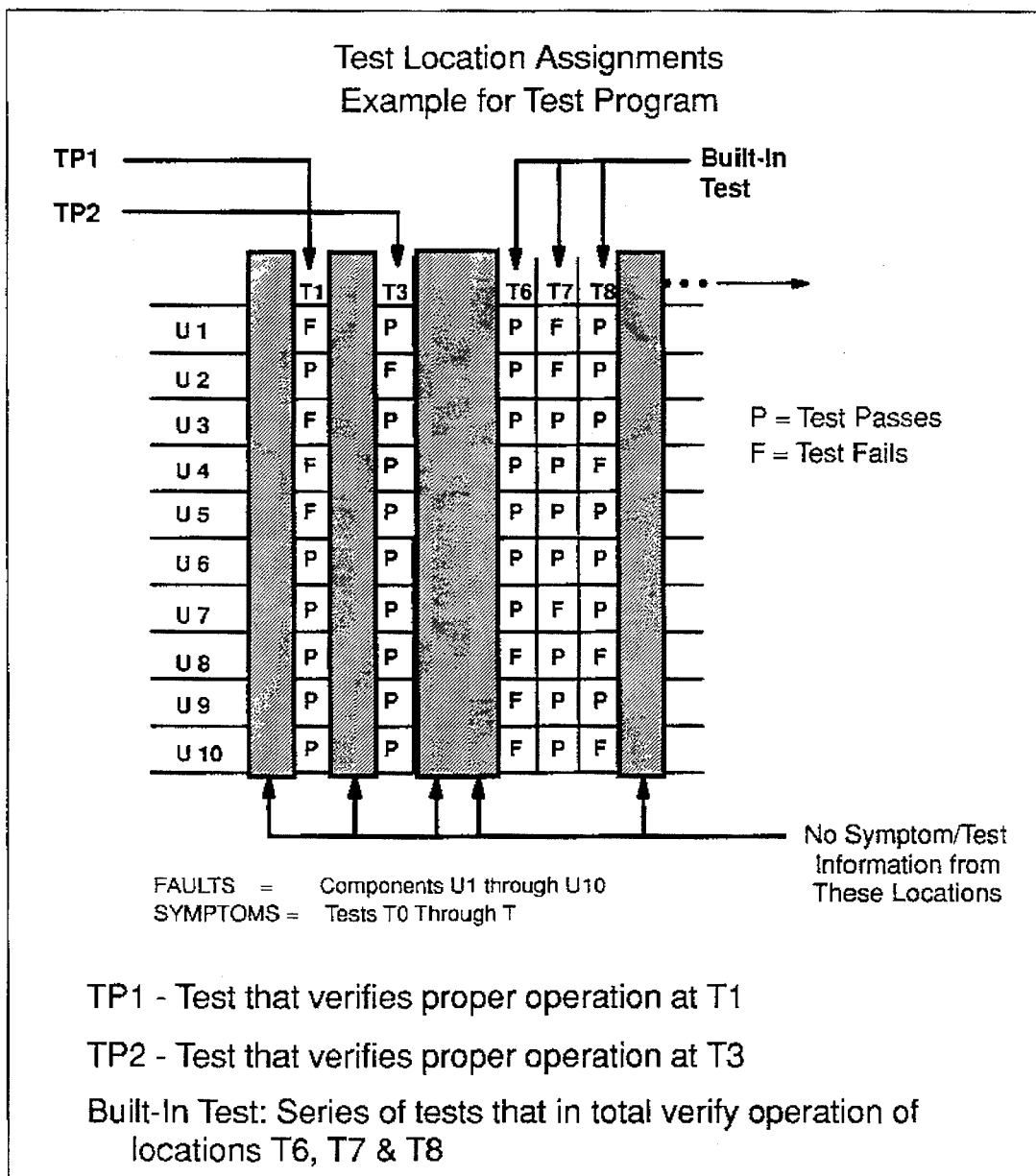
FIG. 8 shows an example of linking symptoms to tests and the resulting run-time diagnostic knowledge base contents.

Once the design data has been captured, it must be translated into a specific form, a Diagnostic Knowledge Base, which includes a Fault/Symptom Matrix (FSM). The Diagnostician™ utilizes test results to dynamically pinpoint faults. In order for this to occur, it must have both sufficient information about the design, and the capability to recognize test results when they are made available. This requires knowledge of every failure that can occur in the design—each fault that could occur—and each symptom that can be gathered—and knowledge of every possible test that can be run. Thus, the Fault/Symptom Matrix is a mapping of each fault possible to each test result (symptom) possible. FIG. 7 shows a sample Fault/Symptom Matrix. FIG. 8 shows the linkage between the fault/symptom matrix and tests.

The FSM can be thought of as a series of AND/OR equations. For each Fault row, the test results can be ANDed together, and for each Symptom column the test results can be ORed together. For example, for row U1 of FIG. 7, the following equation is used:

U1=T0=P and T1=F and T2=P and T3=P and T4=F and T5=P and T6=P and T7=F and T8=P and T9=P For column T9, the following equation occurs:

IF T9=P, U1, U5, U6, U7, U10

IF T9=F, U2, U3, U4, U8, U9

Because the FSM contains a complete mapping of Faults to Symptoms, and because this data can be utilized during run-time, the FSM forms the basis for all Reasoning.

In order for the Fault/Symptom Matrix to be used during a diagnostic session, it must be transformed into a format suitable for the run-time Diagnostician. Because this transformation is performed only once per model, it is done prior to the run-time, in Parts Three and Four.

Part Three (3)—Addition of Test and user Display information to the Diagnostic Knowledge Base The process of developing a diagnostic knowledge base involves 1) defining a set of tests to be applied to the item to optimize the fault isolation capability, and 2) defining linkages that will be used by the run-time system to integrate tests, technical information and the diagnostic knowledge base. The Diagnostic Profiler™ provides the framework for performing these definitions within the diagnostic knowledge base. The Diagnostic Profiler™ provides the ability to analyze the system from the perspective of fault locations and potential test locations, and then by the ability to quickly calculate the resultant diagnostic characteristics associated with the application of tests to the potential test locations.

Use of the Diagnostic Profiler™ to develop a diagnostic strategy is iterative and includes the following steps:

Identifying specific design changes that could be made to support testability

Defining what test locations are to be used (tested)

Defining how the locations will be tested (built-in test, edge test, probing)

Calculating the resultant diagnostic characteristics profile (testability parameters)

Saving the postulated set of tests as a candidate diagnostic strategy

Evaluating the relative cost of implementing the selected tests and the test effectiveness of each candidate Performing trade-offs to derive/select the best candidate.

Defining run-time linkages for test symptom collection, and technical information display.

The run-time diagnostic software is an integration of the diagnostic knowledge base, or logic, the test program or test data, and the technical information. Therefore the linkage data is that data that provides for the specific integration of these elements. There are three primary types of linkages:

Test-related linkages

To Test Programs or Modules which integrates the knowledge base with the actual execution of tests To Test Set-up and Clean-Up Procedures which links the knowledge base to the on-line documentation Fault-related linkages To Repair Procedures which links the knowledge base to the on-line documentation To Child model knowledge bases System-related linkages To primary test data gathering mechanisms, such as an end-to-end test program or a 1553 data bus interpretation.

Part Four (4)—Preparation of the Diagnostic Knowledge Base for efficient run-time operation Typically, for any system that manipulates information, data can be divided up into static data and dynamic data. Test data is dynamic since it can contain different values for different tests based on the actual fault. The design undergoing test, and thus the model of the design, is static. It will not change during run-time, regardless of the values of the test data.

In order to assure the most efficient utilization of the captured design data, it is transformed into a suitable format. Because the design data is usually not dynamic, the transformation is best performed before run-time.

The Fault/Symptom Matrix preprocessing transformation is actually a two step process. Step One (1) analyzes each row in the matrix against every other row based on a specific Set Covering (SC) Algorithm. Step Two (2) takes the FSM and Covering data and creates a Diagnostic Knowledge Base. Only when a Knowledge Base for a particular design exists, can that design be fault isolated using the Run-Time System.

Figure 9:
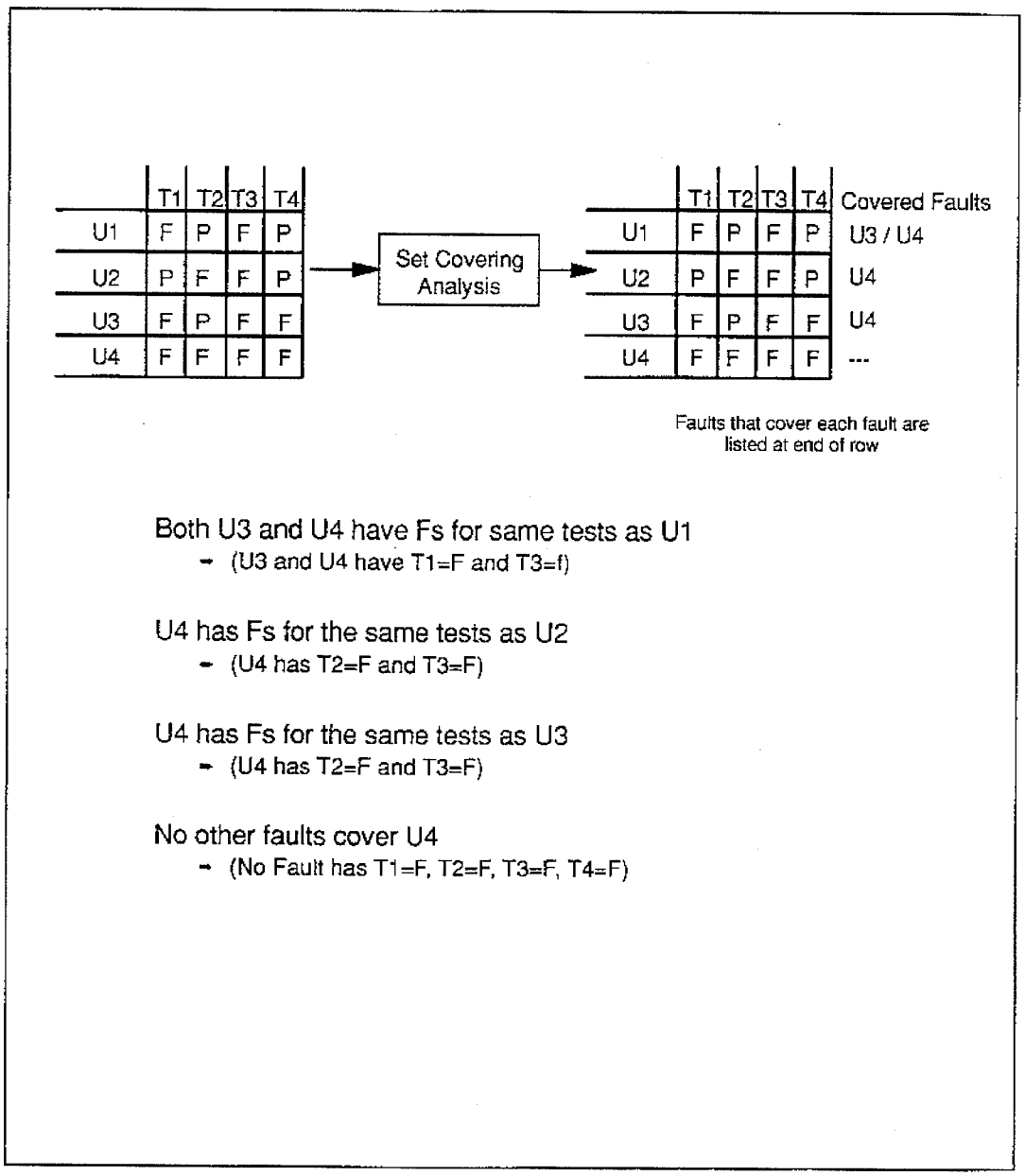
FIG. 9 is an example of a Set Covering Analysis.

The Fault/Symptom Matrix maps each Fault to a set of expected Symptoms. The FSM treats each Fault as independent of every other fault. Under many circumstances, this is sufficient. Unfortunately, certain failures may propagate internally such that some faults are covered by other faults. When this occurs, failure to recognize this covering will result in incorrect diagnosis (errors in fault localization). To prohibit this from occurring, a Set Covering Algorithm is used during run-time. In order to prepare the Knowledge Base for this process, the FSM is interrogated during the Preprocessing stage such that the failures in each row (fault) are compared to the failures in every other row (fault). The result of the process is that each row has appended to it a list of other faults that cover the fault. This list indicates how many other rows (faults) have the same set of expected failed test symptom data (are covered) or the same and additional expected failure data. FIG. 9 illustrates this process using a simple Fault/Symptom Matrix as an example. Computation time during run-time is greatly reduced by this set covering approach.

Once Set Covering Analysis is performed on the Fault/Symptom Matrix, the Matrix with the appended list of covered faults for each row is transformed into a binary Diagnostic Knowledge Base. This binary Knowledge Base is used during run-time.

Part Five (5)—Knowledge Base Utilization (Run-Time System)

The Diagnostic Knowledge Base contains the mapping of the faults that can occur in a design against all symptom data that can be gathered via tests. It also contains information on which rows (faults) can be explained (are covered) by other rows (faults). This knowledge base is static. It remains the same regardless of the test data sent to it. The overall Diagnostician™ Run-Time system is dynamic. It is able to interpret any one or more sets of symptom data. This interpretation results in a Fault Call-Out or a Fault Suspect List (ambiguity group). The more pertinent symptom data is received by the Diagnostician™ Run-Time system, the smaller the Suspect List becomes. When the Suspect List has shrunk to its smallest level—defined as the point when either no further symptom information is available from the test data sources or the Suspect List contains a single replaceable unit, a Fault Call-Out, the diagnostic process is completed.

Figure 10:
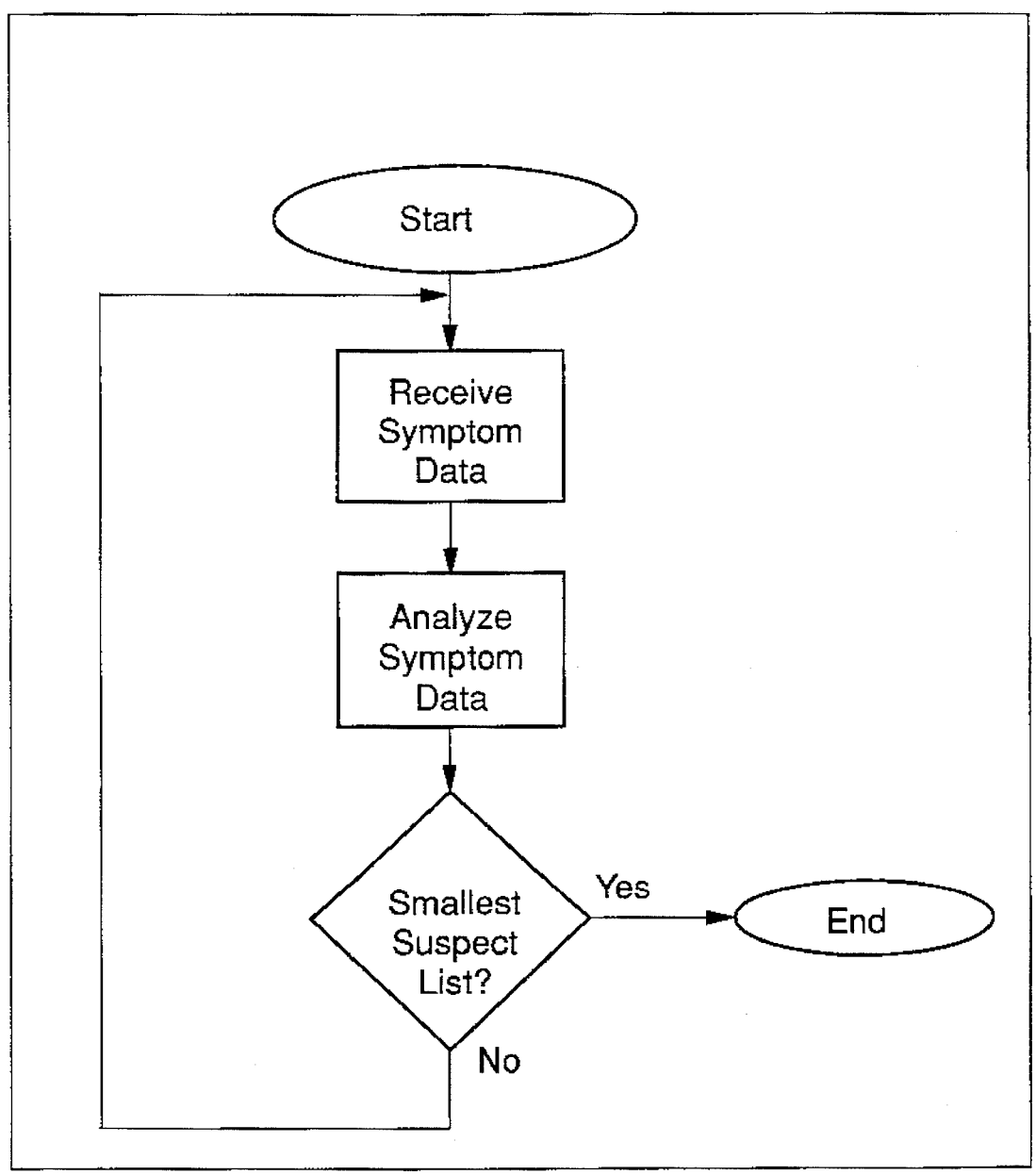
FIG. 10 is a Run-time Flow Chart overview.

The process of receiving symptom data, creating or reducing the suspect list, and receiving additional data is an iterative process. FIG. 10 illustrates this process.

The Diagnostician™ Run-Time System performs two functions. It analyzes incoming symptom data in order to produce a suspect list; and it analyzes the suspect list to determine if it can be further reduced and what specific symptoms can reduce it. By analyzing the suspect list to determine what additional symptoms can be gathered to reduce the list's size, the Diagnostician™ Run-Time system can request specific test data from the Symptom Collection System.

Figure 11:
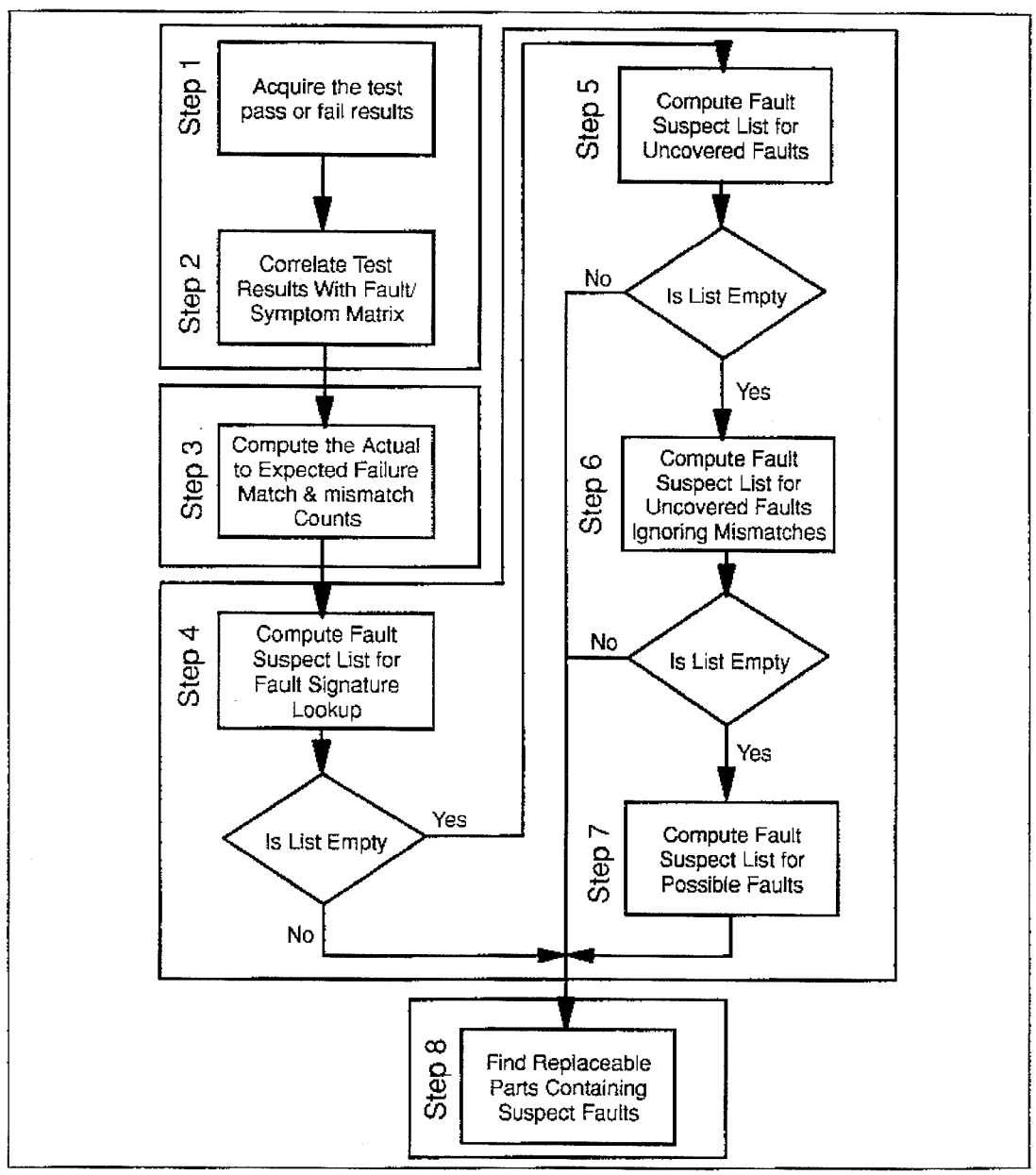
FIGS. 11 and 13 are detailed flow charts with algorithms defining the entire invention's operation, including the Set Covering and Fault Elimination Algorithm.
Figure 12:
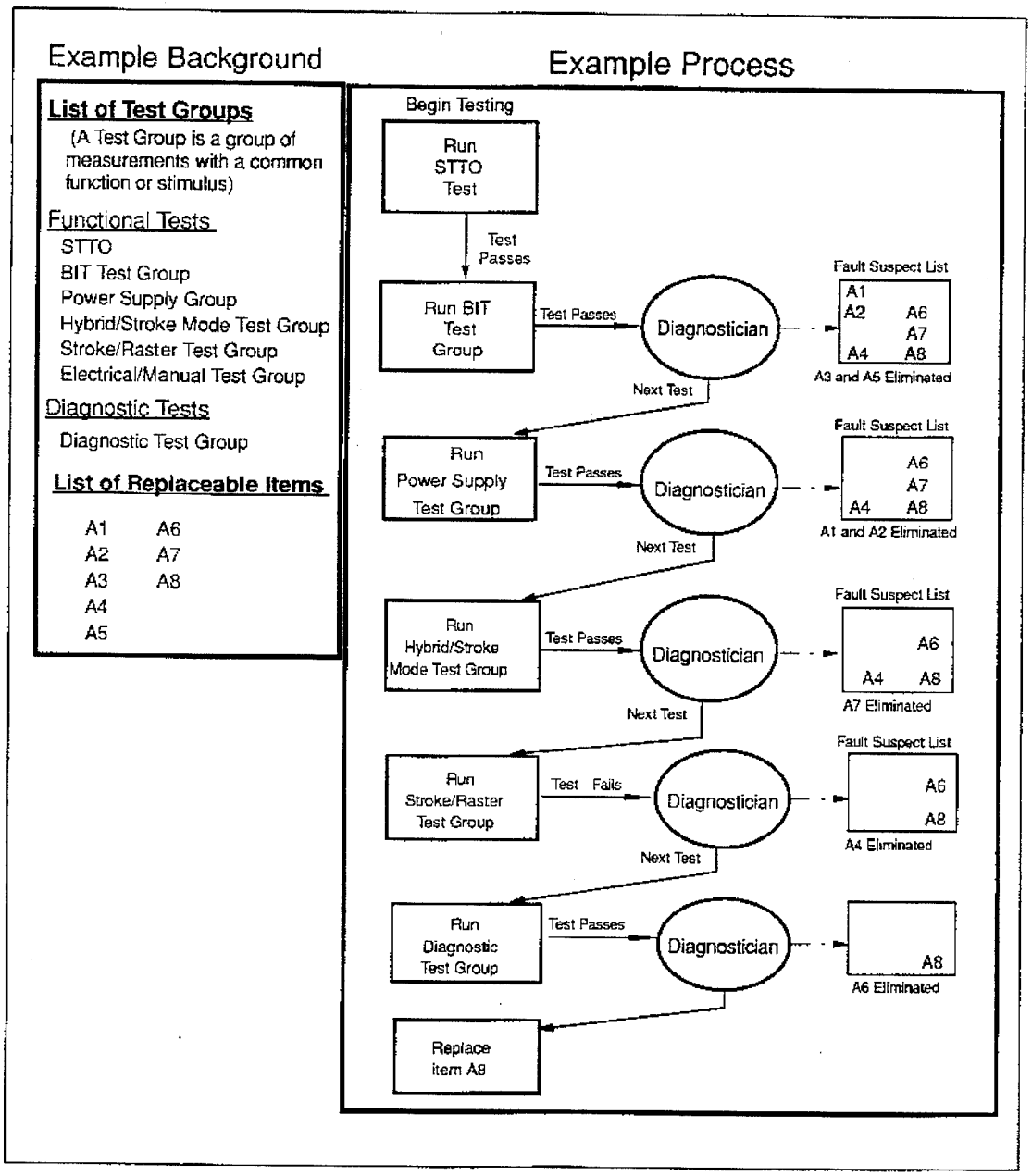
FIG. 12 is an example of how the Diagnostician™ generates and updates the fault suspect list based upon test results.

The first portion of the process, which analyzes symptom data to reduce the suspect list to the smallest possible size is the primary focus of the subject invention. This is because the run-time system will act on as many or as few pieces of test result data (symptoms) as are available. Many other commercial products are available which are based upon pre-computed fault trees, and determine the "next best test" to perform to most quickly isolate to the faulty item. These approaches react to one piece of test result data at a time, and subsequently traverse through a pre-computed fault tree. The subject invention's run-time approach is dynamic in that it will interpret any and all symptom data that it is presented with. There is no precomputing of optimum test sequences which guide the diagnostic process through a lengthy troubleshooting procedure. The result of the approach is highly dynamic, fast and flexible. The approach can also perform the "next best test" analysis, however this is not a primary focus of the invention. Our approach reduces the amount of code that is required during development because it does not rely on these precomputed procedures. Because the creation and update of the suspect list involves specific steps, this process will be discussed in detail. Following this will be a discussion of the process that pinpoints the remaining useful symptoms. The Diagnostician™ Run-Time System utilizes the Knowledge Base and incoming symptom data to perform diagnostics. Although the Knowledge Base is in binary form, it can still be thought of as a mapping of faults to symptoms, with Set Covering information appended to each fault (row). The actual process of utilizing symptom data is very systematic. The following illustrates this process using a series of steps, listed below and shown in FIG. 11. FIG. 12 is an example of how the Diagnostician™ uses test inputs to generate and update a fault suspect list to its end result.

Suspect List Creation/Update:
  Map the Test Data to the Knowledge Base
  Step 1: Acquire the Test Pass or Fail Results
  Step 2: Correlate Test Results with the Fault/Symptom Matrix
  Analyze the Fault Evidence
  Step 3: Compute Actual to Expected Failure Match/ Mismatch Counts
  Select the Suspect Faults
  Step 4: Compute the Fault Signature Lookup Fault Suspect List
  Step 5: If There Are No Suspect Faults, Compute The Uncovered Fault Suspect List
  Step 6: If There Are No Suspect Faults, Compute The Uncovered Fault Suspect List Ignoring Mismatches
  Step 7: If There Are No Suspect Faults, Compute The List of Possible Faults
  Final Diagnosis
  Step 8: Produce A List Of the Replaceable Parts Containing the Suspect Faults In the List

MAP TEST DATA TO KNOWLEDGE BASE

Step 1—Acquire the Test Pass or Fail Results. The first step in the reasoning process is to acquire, or retrieve the current test results. This is a simple data acquisition function. The Diagnostic Knowledge Base has a definition of how to request and input the test result data corresponding to each test. This information was defined by the user during development through the Diagnostic Profiler.™ For example, in a test equipment application, the test program writes test result data, in pass/fail format, to an ASCII file, the name of which is defined during the profiling process. An example name is RESULTS.OUT. The software opens the file RESULTS.OUT and loads its contents into active memory. The results file can contain one or many entries. The file contains the name of the test location and the test result (pass, fail or unknown).

Step 2—Correlate the Test Results with the Fault/Symptom Matrix. The software parses the test results file. For each test result entry (symptom), the test name is looked up in the diagnostic knowledge base to determine which fault/symptom matrix test column is being referenced and the result is evaluated as pass, fail or unknown. The results are stored in active memory.

Step 3—Compute Actual to Expected Failure Match and Mismatch Counts. This step is initiated by setting the actual to expected failure match count and mismatch count to zero for each fault in the diagnostic knowledge base. Once that is done, the match count and mismatch count for each fault is evaluated in turn as follows: For the fault being worked on, each test result is evaluated in turn and when appropriate used to increment the fault's match count or mismatch count. If the actual test data is a pass and the expected result is a fail, the mismatch count is incremented. If the actual test data is a fail and the expected result is a fail, the match count is incremented.

Step 4—Compute the Fault Signature Lookup Fault Suspect List. The list of suspect faults is cleared and the count of number of entries in that list is set to zero. Each fault is examined in turn to determine if its expected results exactly match the observed data. This will occur whenever the match count for the fault is the same as the number of actual fail results observed. Each fault meeting this criteria is added to the fault suspect list and the count of suspects incremented.

Step 5—If There Are No Suspect Faults, Compute The Uncovered Fault Suspect List. Each fault in the diagnostic knowledge base is examined in turn to determine whether it should be added to the suspect list of faults or discarded. The criteria applied is as follows:

(a) Discard the fault if it does not match at least one Failed Test Result (b) Discard the fault if it's mismatch count is greater than zero (c) Discard the fault if it is an input to a component (d) Discard the fault if it has a failure probability of zero (e) Discard the fault if it is covered by another fault, that is, there is another fault that meets criteria (a)(b)(c) and (d) and also matches all the test failures matched by this fault and at least one more test failure.

Each fault which is not discarded by these criteria is added to the fault suspect list and the count of suspects incremented.

Step 6—If There Are No Suspect Faults, Compute The Uncovered Fault Suspect List Ignoring Failures. Each fault in the diagnostic knowledge base is examined in turn to determine whether it should be added to the suspect list of faults or discarded. The criteria applied is as follows:

(a) Discard the fault if it does not match at least one Failed Test Result (b) Discard the fault if it is an input to a component (c) Discard the fault if it has a probability of zero (d) Discard the fault if it is covered by another fault, that is there is another fault that meets criteria (a)(b) and (c) and also matches all the test failures matched by this fault and at least one more test failure.

Figure 13A:
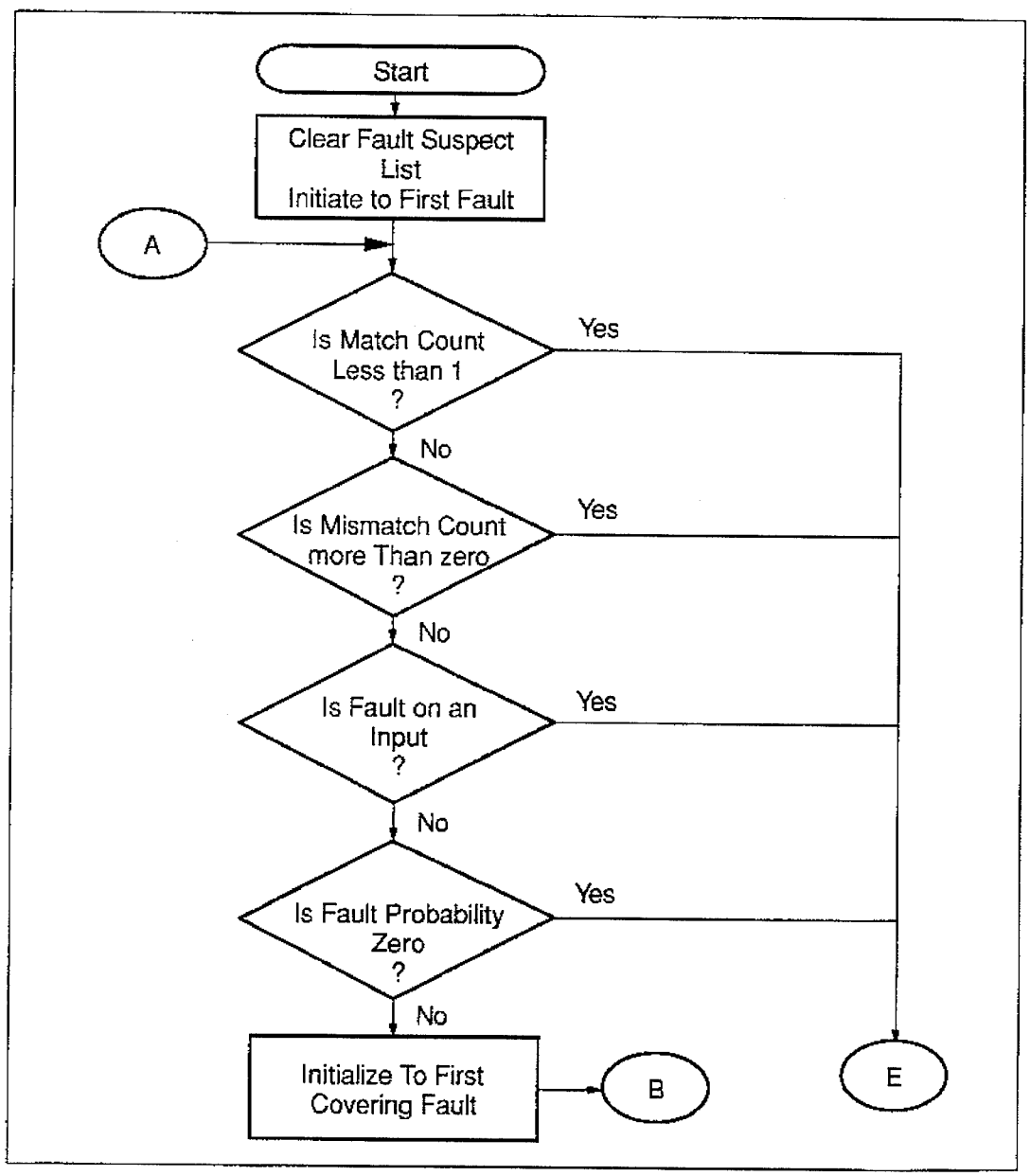
Figure 13B:
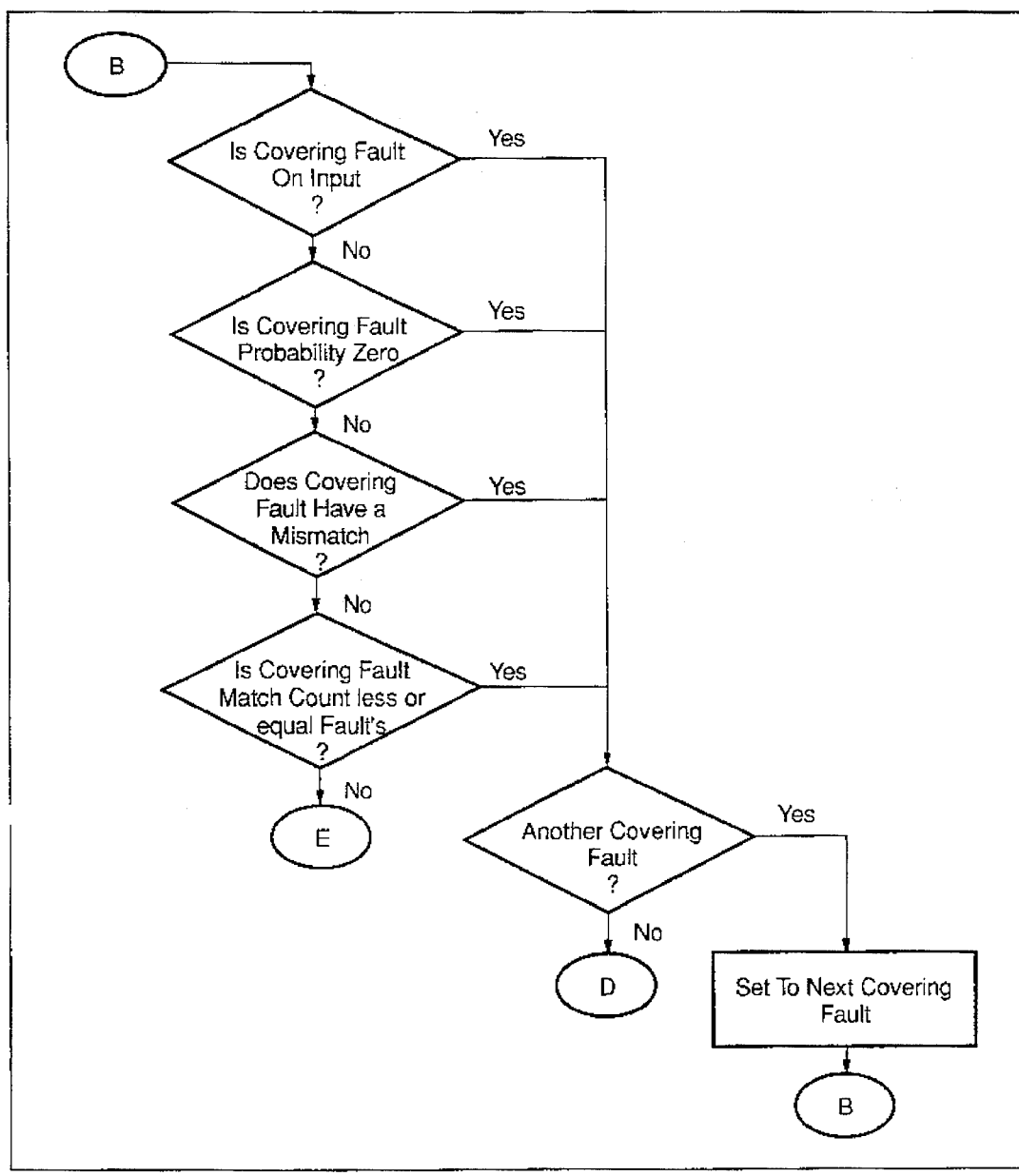
Figure 13C:
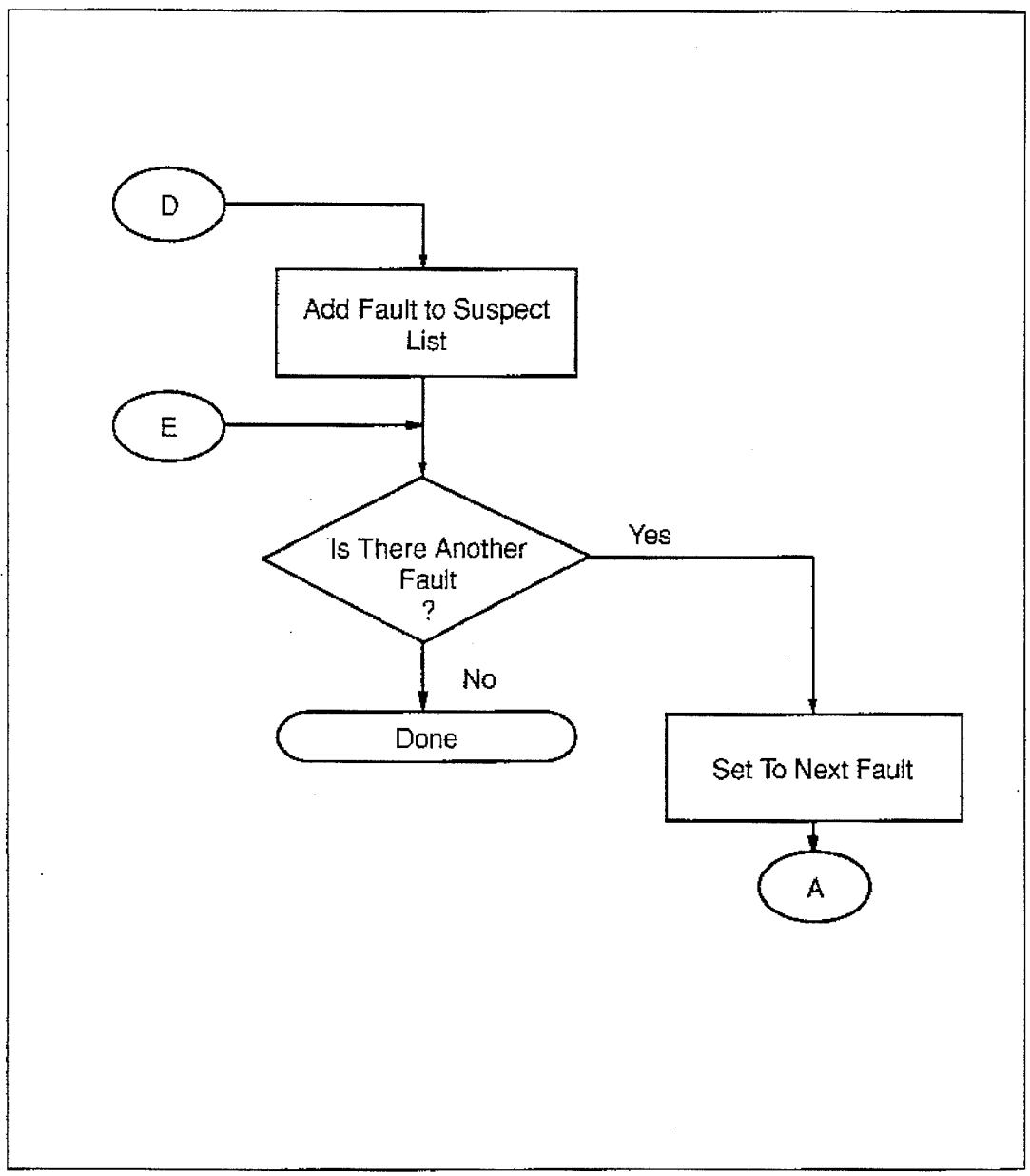

Each fault which is not discarded by these criteria is added to the fault suspect list and the count of suspects is incremented. Steps 5 and 6 are the key attributes of the process and are detailed in the three pages of FIG. 13.

Step 7—If There Are No Suspect Faults, Compute The List of Possible Faults. If the actual data has at least one fail result applicable to a fault in the diagnostic knowledge base, the list of suspects will not be zero and this step will not be implemented. The only applicable data is pass data which can rule out some faults. This step selects those faults which were not ruled out. Each fault in the diagnostic knowledge base is examined in turn to determine whether it should be added to the suspect list of faults or discarded. The criteria applied is as follows:

(a) Discard the fault if it has any mismatches

Each fault which is not discarded by this criteria is added to the fault suspect list and the count of suspects incremented.

Step 8—Produce A List Of the Replaceable Parts Containing the Suspect Faults In the List. The list of suspect replaceable parts in the diagnostic knowledge base is cleared. Each fault in the list of suspect faults is examined to determine whether another replaceable part should be added to the list of suspect replaceable parts as follows: The fault being examined from the fault suspect list is looked up in the diagnostic knowledge base to identify the replaceable part that contains it. The replaceable part is compared with each replaceable part already in the list of suspect replaceable parts. If no match is found, it is added to that list.

Identifying The Next Best Test (Optional)

Figure 14:
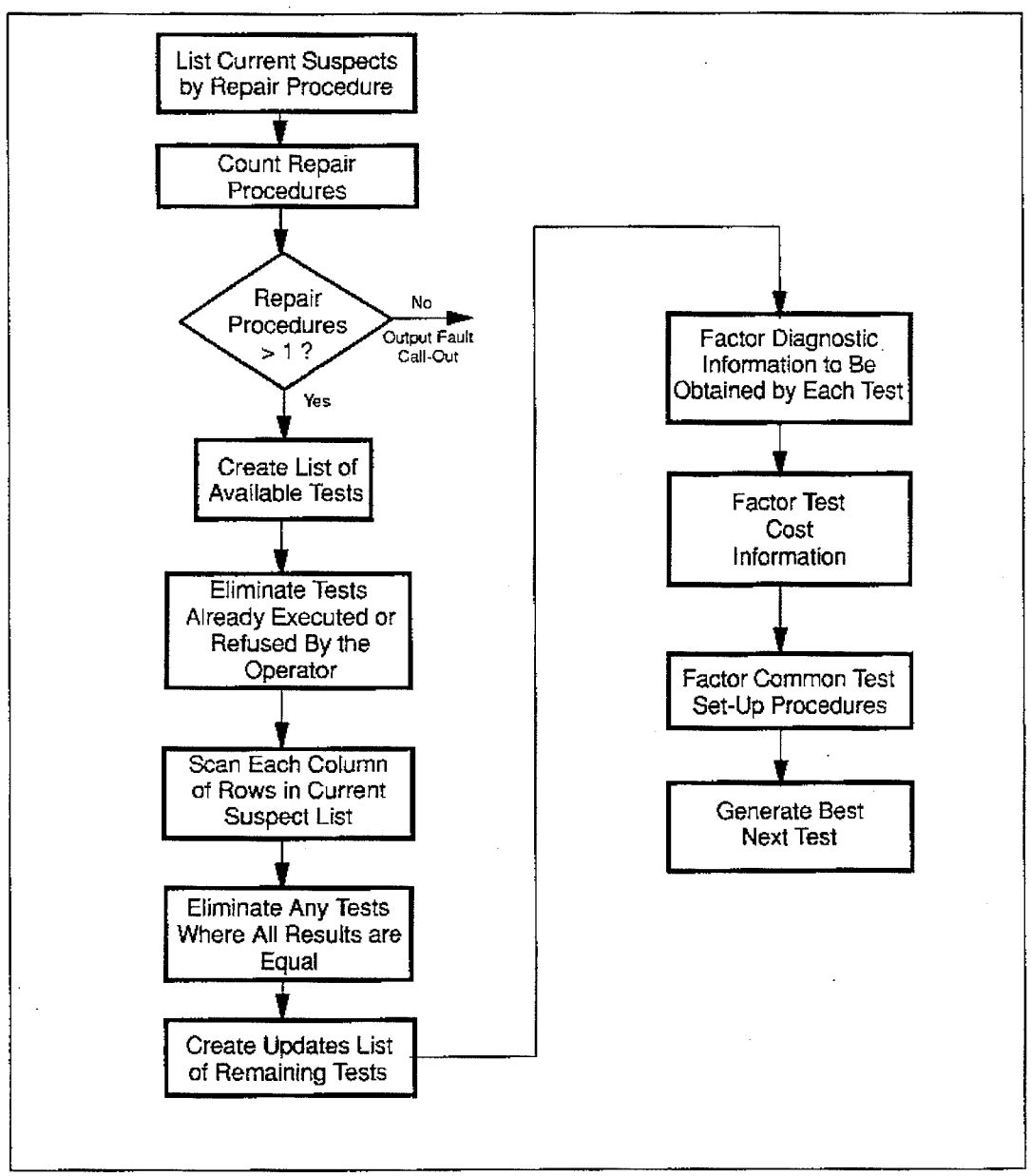
FIG. 14 is an overview of the Diagnostician's process for selection of additional tests to be executed to reduce the fault suspect list.

After the Suspect List has been created or updated, if further tests are available that can reduce this list, one of these tests may be selected for implementation (symptoms should be gathered). The following lists the steps required to perform this process. FIG. 14 is an example of the factors involved in the selection process.

Step 1—List Suspects by Repair Procedure

Step 2—Count Number of Repair Procedures (if 1, stop testing)

Step 3—Create List of Selected Tests from Matrix

Step 4—Eliminate Tests Already Performed

Step 5—Scan Each Column of Rows in Suspect List

Step 6—Eliminate Any Test where all Results are Equal

Step 7—Create Updated List of Remaining Tests

Step 1—Because the goal of the diagnostic process is to pinpoint a failure down to the lowest replaceable unit, if the suspect list contains multiple suspects all with the same repair procedure, the diagnostic process is completed. For example, a chip may have many outputs that can fail. Each of these outputs can be contained in a Suspect List. Because the chip cannot be fixed, but only replaced, it is irrelevant which output failed. Thus, if the suspect list contained multiple outputs from the same chip, the failure would be the chip, and the diagnostic session has been completed.

Step 2—If the repair procedure count is one, only a single repair procedure remains, thus the diagnostic process has ended. If it is greater than 1, step 3 begins. If the list is 0, the diagnosis is no-fault-found (no replacement procedures remain).

Step 3—The symptom name for each column in the matrix that can be run (selected during development) is placed in a test file.

Step 4—Remove all tests in this file that have already been run during the current diagnostic session.

Step 5—Retrieve the test file and the suspect list. For each test in the test file, scan that column for each suspect. Count the number of expected Passes and the number of expected Fails.

Step 6—For each test pass/fail count, if there is only one type of result for a particular column, remove that test from the test file. A column where all expected results are the same for a given test indicates that the result of that test has no diagnostic significance. It is thus eliminated from the test file.

Step 7—Update the test file list so that it contains only those tests that, if performed, will reduce the suspect list. This file can be used by the Run-time system to request additional test data from the data collection system.

Test Sequences and Test Result Groups

During run-time, as more test results become available, the diagnostic reasoning module can utilize these results to improve fault localization by reducing the ambiguity group of fault suspects. When either the ambiguity group contains a single replaceable unit, or when no further tests exist that can reduce the group's size, the diagnostic analysis is completed.

To the diagnostic reasoning module, the most efficient manner to gather test data is all at once. To the test system, this might not be practical. Certain tests may require setup and cleanup procedures that are time consuming. Remember, in run-time the inference engine will only run tests with some diagnostic significance. Under most testing circumstances, the most time efficient process involves a tradeoff between running groups of tests and running tests in a singular fashion based on a selection of the next-best-test that is known to provide the most diagnostic information.

Because of the tradeoff between running all tests and running one at a time, the Diagnostician™ Run-Time System contains the capability to guide and run tests in a sequential manner. The sequencing is based on three criteria. These criteria are listed below in order of importance, with highest importance first.

Most diagnostic information regardless of result

Least costly

Common setup/cleanup procedure(s)

The purpose of running any test is to reduce the current ambiguity group. Because the Run-Time System is dynamic, the selection of what tests to run is based on the previous results. For a given run-time scenario, remaining tests can be categorized as those with diagnostic significance and those without.

Tests without any diagnostic significance are those that, regardless of whether their result is pass or fail, will not reduce the current ambiguity group. Under other circumstances, these tests will reduce an ambiguity group, but not under the present circumstances. In order for the inference engine to prioritize the remaining tests in order of those containing the most diagnostic significance, the Fault Symptom Matrix is analyzed. For each fault, a signature exists of which tests should pass and which should fail. For those faults in the current ambiguity group, and for the remaining diagnostically significant tests, the inference engine analyzes how many passes and how many fails exist for each test. It selects the test that has the closest number for each.

For example, using the matrix of FIG. 7, if the current ambiguity group contains faults U1, U2, U3 and U4 and the remaining tests are T5, T7, T8 and T9. The Inference Engine uses the Matrix to calculate that:

T5 has two fails and two passes

T7 has two fails and two passes

T8 has three passes and one fail

T9 has three fails and one pass

The diagnostic run-time inference engine will select T5 and T7 since they have the same number of passes and fails. Why does it select these? The system does not know before a test is run whether it will pass or fail. If it gives each result a 50% chance, then it will run the test that will eliminate the most faults, regardless of whether the test passes or fails. This is why it chooses tests with the closest number of passes and fails.

For the example on the last page, both T5 and T7 are the best choice. If the test system could run both, it should. If a choice must be made between the two, the run-time system can use other criteria, as follows:

Least costly

Common setup/cleanup procedure(s)

Both of these criteria involve looking at the process of running a test. Test cost is a broad measure of how much equipment, time, and software is required to run the test. Common Setup/Cleanup Procedures involves seeing if tests with common setup/cleanup can be run together.

In our example, let us assume that test T5 and test T7 both require the same test equipment. They both have the same setup/cleanup procedures. Test T7 is a simple frequency check. Test T5 requires complex frequency spectrum stimulus and analysis, therefore, test T5 has a higher cost than T7, and both have the same setup/cleanup procedures. Thus, test T7 is run first.

Under many circumstances, test cost and setup/cleanup procedure analysis will not help differentiate between tests with equivalent diagnostic significance. In these cases, the inference engine will select the test at the leftmost point in the Fault Symptom Matrix.

SUMMARY

In summary, an automated diagnostic reasoning process and implementation has been invented which is either more effective at fault localization or more accurate than existing commercial reasoning techniques and does not require the computation time of the research minimum set covering algorithms. The implementation provides a means of embedding the diagnostic reasoning capability in any system as a part of the product hardware, maintenance technician aid hardware or automatic test equipment.

INDUSTRIAL APPLICATIONS

The use of model based reasoning as defined in the subject invention generates a new paradigm in which diagnostics is separated from symptom collection. Diagnostic knowledge bases and the AI inference engine can be hosted on workstations, PC's, and microcontrollers. This leads to industrial applications outlined below:

Most complex processes and products, both electronic and electromechanical in nature, contain some sort of health monitoring system which detects failures. Utilizing the subject invention in the future, these systems will be converted to integrated health monitoring and fault isolation systems which provide not only fault detection, but, also isolation to the repairable part.

As systems become more complex, the design of these systems includes many alternative paths to reduce the possibility of a total system failure. The invention described herein will allow the on-line diagnostics to permit automatic reconfiguration where necessary to preserve system operation.

Most technical manuals are currently being converted into electronic format and are hosted on portable computers. Utilizing the subject invention, the portable devices will be able to operate as an intelligent technical manual providing dynamic trouble-shooting procedures based upon prior test results.

Because of increasing complexity, the systems and subsystems now being designed include a large amount of built-in-test. Success with built-in-test has been elusive. With this invention, the built-in-test can be converted to information and diagnostic outputs thereby creating built-in diagnostics instead of built-in-test.

Many large systems contain internal bus structures which move data across the subsystem functions. They also include large amounts of built-in-test. Utilizing this invention, umbilical cord SMART testers can be developed which are connected to, and read, the bus data and interpret that data to provide diagnostics to the field service person.

Currently, the interrogation of space systems for NASA as well as telecommunications systems prioritize the amount of data to be sent along telemetering channels. Utilizing this invention, the amount of information required to do diagnostics is appreciably reduced resulting in less data to be transmitted to the ground stations.

Automatic test equipment is programmed with a family of instrumentation and test procedures in order to provide a large number of tests in an off-line maintenance environment. Utilizing this invention, these performance oriented tests can be translated into diagnostics without the need to code additional diagnostic tests. The separation of test and diagnostics also provides a means to upgrade the test instruments without impacting the diagnostic programs. This will enhance rehostability of existing programs to newly designed test equipment.

This invention provides a knowledge base of the process or product which is normally utilized with input symptom data to provide automated fault isolation using the AI Inference Engine working with the diagnostic knowledge base. For training systems the invention can operate in a reverse mode. Namely, it can provide symptoms given certain fault presumptions. It therefore becomes an inference engine for training maintainers and operators on how to recognize faults when they occur. It also provides the designer with an assessment of the capability of his design to detect critical failure modes that may occur in his system.

The system can be used in classroom environments to train designers as well as maintainers and operators for specific products and processes.

Major system designs require simulation prior to formalizing the design approach. These simulators normally are based upon performance data and behavioral data concerning the interaction of the system with the users. Utilizing this invention, the simulation can be extended to include fault simulation and the impact of those faults on the overall system performance. This would extend the performance simulator into a true virtual system that will act in a manner consistent with actual field operations.

In implementing a complex process, one usually finds critical measurement points where meters or lights have been installed to indicate potential failures. These panel lights and indicators normally must be interpreted by an alert, well-trained service technician in order to isolate faults. By utilizing a model of the process, the AI inference engine can act upon meter readings and provide fault isolation to a central maintenance computer. Utilizing an eye piece display and a small sized computer mounted on the maintenance technician's clothing, the overall operation can be performed by a "man on the move" with this capability. Meters can be read and data inputted using voice recognition. Nuclear power utilities can be monitored along with other Industrial processes.

Since the electronics industry has achieved large amounts of downsizing in the instrumentation area, the traditional "front panels" have been essentially eliminated. Reaction to this has been the development of virtual front panel instrumentation which can be used as a virtual instrument to program its function and later convert it to a run-time operation. This invention can be utilized as a virtual instrument asking for data and providing diagnostics when called into play by the system designer.

The nature of this invention allows it to be utilized in sophisticated training games for sharpening skills with respect to problem solving. Utilizing different knowledge bases, the system can be scaled to the point where mentally disabled persons can be induced into sustained training for improving their retention and analysis skills.

We claim:

1. A method for automated diagnosis of faults in a system containing reparable parts comprising the steps of:

selecting a set of faults representing all known failures which can occur among a given plurality of reparable parts contained in the system, wherein each fault is characterized by symptom data comprising expected passing or failing results for tests that can be applied to a plurality of test locations in the system;

selecting a plurality of test locations in the system at which given tests can be applied and respective outputs can be acquired as actual passing or failing results for those tests;

mapping the set of faults to their characteristic symptom data of expected passing or failing test results by generating a fault/symptom matrix defined by the set of faults as matrix row indices, by the plurality of test locations as matrix column indices, and by the expected passing and failing results for the plurality of test locations as matrix elements representing the symptom data for each of the respective faults;

performing tests at at least some of the plurality of test locations of the system, then acquiring the outputs of the performed tests as actual passing or failing test results;

correlating the actual passing or failing test results to the expected test results comprising the symptom data for the faults defined in the fault/symptom matrix; and creating a suspect list of faults having symptom data corresponding to the actual passing or failing test results of the performed tests;

wherein said method is implemented by programmed means of a computer processing unit, said fault/symptom matrix is stored as a knowledge base of the computer processing unit, and the outputs of the tests performed on the System being diagnosed are provided as inputs to the computer processing unit;

wherein said method implemented by the programmed means of the computer processing unit is optimized for run-time efficiency by preprocessing the steps of selecting the set of faults and plurality of test locations and generating the fault/symptom matrix and storing it as a preprocessed, deterministic part of the knowledge base beforehand, then dynamically processing the steps of acquiring the outputs of the performed tests, correlating the actual test results to the stored fault/symptom matrix, and creating the suspect list of faults at run time.

2. A method for automated diagnosis of a system according to claim 1, further comprising the steps of reducing the suspect list of faults by performing additional tests at other test locations and correlating the actual test results to the symptom data for faults on the suspect list and updating the suspect list of faults reductively.

3. A method for automated diagnosis of a system according to claim 2, further comprising the steps of producing a list of repairable parts containing the faults on the suspect list, and continuing the step of reducing the suspect list of faults until the list of repairable parts contains a single repairable part or until no further test can be performed that will reduce the suspect list of faults.

4. A method for automated diagnosis of a system according to claim 1, wherein said step of creating the suspect list of faults includes, if no faults have been placed on the suspect list by correlation of actual test results to the symptom data of the fault/symptom matrix, the substep of examining each fault in turn and adding it to the suspect list if its symptom data matches at least one actual failing test result.

5. A method for automated diagnosis of a system according to claim 2, wherein the step of performing additional tests includes the preliminary substeps of scanning the list of identified tests for the system, eliminating the tests already performed, scanning each column of the fault/symptom matrix representing the other tests for those faults currently remaining on the suspect list and eliminating those tests where the columnar passing or failing symptom data for the currently remaining faults are all the same, and creating an updated list of tests to be performed on the system.

6. A method for automated diagnosis of a system according to claim 5, wherein the step of performing additional tests includes the further preliminary substep of selecting only those tests from the updated list of tests to be performed which have most diagnostic significance by scanning the fault/symptom matrix for those faults currently remaining on the suspect list, counting for each remaining fault the number of passing and failing symptom data defined for the remaining tests, and selecting only those tests where the number of passing symptom data is closest to the number of failing symptom data as being most diagnostically significant.

7. A method for automated diagnosis of a system according to claim 1, wherein said method implemented by the programmed means of the computer processing unit is optimized for run-time efficiency by preprocessing the fault/symptom matrix with a set cover analysis in which each fault row has identified with it all other fault rows having the same failing symptom data, so that the steps of correlating the test results to the faults of the fault/symptom matrix and creating the suspect list of faults can be shortened at run time.

8. A method for automated diagnosis of a system according to claim 1, further including the step of incorporating said method implemented by programmed means of the computer processing unit in a single microcontroller chip set.

9. A method for automated diagnosis of a system according to claim 1, further including the step of coupling an output of the computer processing unit to a display unit for display of information obtained by diagnosis of the system.

10. A method for automated diagnosis of a system according to claim 1, further including the step of coupling an output of the computer processing unit for transmission to a remote station.

11. A method for automated diagnosis of a system according to claim 1, further including the step of coupling an output of the computer processing unit for guidance of test probes for tests to be performed on the system.

12. A method for automated diagnosis of a system according to claim 1, wherein said steps of selecting the set of faults and plurality of test locations and generating the fault/symptom matrix includes the preliminary step of capturing design data representing the interdependencies of all of the parts of the system and converting the design data into a mapping of each possible fault to each possible test result.

13. A method for automated diagnosis of a system according to claim 1 as used for isolation identification of a repairable part of a system.

14. A method for automated diagnosis of a system according to claim 1 as used for on-line diagnosis of a system during system operation to permit automatic system reconfiguration before total system failure.

15. A method for automated diagnosis of a system according to claim 1 as used in an embedded module for built-in diagnosis of a system.

16. A method for automated diagnosis of a system according to claim 1 as used in an embedded module of test equipment for testing a system.

17. A method for automated diagnosis of a system according to claim 1 as used in an embedded module in a space system for remote transmission of diagnostic information to a ground station.

18. A method for automated diagnosis of a system according to claim 1 as used in a training mode wherein the fault/symptom matrix is used to identify expected test results given specified fault assumptions.

* * * * *